United States Patent
McInerney et al.

(10) Patent No.: US 8,745,523 B2
(45) Date of Patent: Jun. 3, 2014

(54) DELETION IN ELECTRONIC BACKUPS

(75) Inventors: Peter McInerney, Cupertino, CA (US);
Pavel Cisler, Los Gatos, CA (US);
David Hart, San Francisco, CA (US);
Eric Weiss, San Francisco, CA (US);
Robert Ulrich, San Jose, CA (US)

(73) Assignee: Apple Inc., Cupertino, CA (US)

( * ) Notice: Subject to any disclaimer, the term of this patent is extended or adjusted under 35 U.S.C. 154(b) by 814 days.

(21) Appl. No.: 11/760,662

(22) Filed: Jun. 8, 2007

(65) Prior Publication Data
US 2008/0307333 A1   Dec. 11, 2008

(51) Int. Cl.
*G06F 3/048* (2013.01)
*G06F 17/30* (2006.01)

(52) U.S. Cl.
USPC ............................. 715/783; 715/810; 715/764

(58) Field of Classification Search
CPC .................................. G06F 3/048; G06F 17/30
USPC .......................................... 715/810, 764, 783
See application file for complete search history.

(56) References Cited

U.S. PATENT DOCUMENTS

| | | |
|---|---|---|
| 5,150,407 A | 9/1992 | Chan |
| 5,150,473 A | 9/1992 | Zulch |
| 5,163,148 A | 11/1992 | Walls |
| 5,276,867 A | 1/1994 | Kenley et al. |
| 5,349,658 A | 9/1994 | O'Rourke et al. |
| 5,369,570 A | 11/1994 | Parad |
| 5,659,614 A | 8/1997 | Bailey |
| 5,664,186 A | 9/1997 | Bennett et al. |
| 5,680,562 A | 10/1997 | Conrad et al. |
| 5,736,974 A | 4/1998 | Selker |
| 5,745,669 A | 4/1998 | Hugard et al. |
| 5,754,178 A | 5/1998 | Johnston et al. |
| 5,758,359 A | 5/1998 | Saxon |
| 5,790,120 A | 8/1998 | Lozares et al. |
| 5,802,175 A | 9/1998 | Kara |
| 5,818,936 A | 10/1998 | Mashayekhi |
| 5,819,032 A | 10/1998 | De Vries et al. |
| 5,819,292 A | 10/1998 | Hitz et al. |

(Continued)

FOREIGN PATENT DOCUMENTS

| | | |
|---|---|---|
| EP | 0629950 | 12/1994 |
| EP | 1152352 | 11/2001 |

(Continued)

OTHER PUBLICATIONS

"Apple Previews Mac OS X Leopard," Aug. 7, 2006 [online] [retrieved on Nov. 26, 2007] Retrieved from the Internet:<URL:http://www.apple.com/pr/library/2006/aug/07leopard.html>, pp. 1-2.

(Continued)

*Primary Examiner* — Andrea Leggett
(74) *Attorney, Agent, or Firm* — Fish & Richardson P.C.

(57) ABSTRACT

Systems and methods are provided for storing and restoring digital data. In some implementations, a method is provided. The method includes displaying a current view, initiating a history view, the history view including two or more visual representations of corresponding earlier versions of the current view, identifying a selection of an item in a visual representation, receiving an input to delete the selected item, and deleting each instance of the selected item in the history view. Other embodiments of this aspect include corresponding systems, apparatus, computer program products, and computer readable media.

16 Claims, 13 Drawing Sheets

(56) References Cited

U.S. PATENT DOCUMENTS

| | | |
|---|---|---|
| 5,831,617 A | 11/1998 | Bhukhanwala |
| 5,832,526 A | 11/1998 | Schuyler |
| 5,961,605 A | 10/1999 | Deng et al. |
| 5,987,566 A | 11/1999 | Vishlitzky et al. |
| 6,006,227 A | 12/1999 | Freeman et al. |
| 6,023,506 A | 2/2000 | Ote et al. |
| 6,097,313 A | 8/2000 | Takahashi et al. |
| 6,112,318 A | 8/2000 | Jouppi et al. |
| 6,134,660 A | 10/2000 | Boneh et al. |
| 6,167,532 A | 12/2000 | Wisecup |
| 6,188,405 B1 | 2/2001 | Czerwinski et al. |
| 6,269,381 B1 | 7/2001 | St. Pierre et al. |
| 6,366,988 B1 | 4/2002 | Skiba et al. |
| 6,396,500 B1 | 5/2002 | Qureshi et al. |
| 6,397,308 B1 | 5/2002 | Ofek et al. |
| 6,424,626 B1 | 7/2002 | Kidambi et al. |
| 6,460,055 B1 | 10/2002 | Midgley et al. |
| 6,574,733 B1 | 6/2003 | Langford |
| 6,604,118 B2 | 8/2003 | Kleiman et al. |
| 6,625,704 B2 | 9/2003 | Winokur |
| 6,629,129 B1 | 9/2003 | Bookspan et al. |
| 6,636,937 B2 | 10/2003 | Peter |
| 6,638,313 B1 | 10/2003 | Freeman et al. |
| 6,701,454 B1 | 3/2004 | Fischer et al. |
| 6,711,572 B2 | 3/2004 | Zakharov et al. |
| 6,714,201 B1 | 3/2004 | Grinstein et al. |
| 6,714,952 B2 | 3/2004 | Dunham et al. |
| 6,725,427 B2 | 4/2004 | Freeman et al. |
| 6,728,735 B1 | 4/2004 | Fong |
| 6,768,999 B2 | 7/2004 | Prager et al. |
| 6,785,751 B1 | 8/2004 | Connor |
| 6,785,786 B1 | 8/2004 | Gold et al. |
| 6,801,229 B1 | 10/2004 | Tinkler |
| 6,857,001 B2 | 2/2005 | Hitz et al. |
| 6,892,211 B2 | 5/2005 | Hitz et al. |
| 6,901,493 B1 | 5/2005 | Maffezzoni |
| 6,918,124 B1 | 7/2005 | Novik et al. |
| 6,947,556 B1 | 9/2005 | Matyas et al. |
| 6,948,039 B2 | 9/2005 | Biessener et al. |
| 6,959,368 B1 | 10/2005 | St. Pierre et al. |
| 6,993,710 B1 | 1/2006 | Coad et al. |
| 7,072,916 B1 | 7/2006 | Lewis et al. |
| 7,099,900 B1 | 8/2006 | Bromley et al. |
| 7,103,740 B1 | 9/2006 | Colgrove et al. |
| 7,107,527 B2 | 9/2006 | Takahashi et al. |
| 7,111,136 B2 | 9/2006 | Yamagami |
| 7,133,902 B2 | 11/2006 | Saha et al. |
| 7,134,026 B2 | 11/2006 | Horiuchi et al. |
| 7,155,486 B2 | 12/2006 | Aoshima et al. |
| 7,174,352 B2 | 2/2007 | Kleiman et al. |
| 7,185,028 B2 | 2/2007 | Lechner |
| 7,200,617 B2 | 4/2007 | Kibuse |
| 7,222,194 B2 | 5/2007 | Kano et al. |
| 7,257,717 B2 | 8/2007 | Huang |
| 7,275,075 B2 | 9/2007 | Cannon |
| 7,284,190 B2 | 10/2007 | Chellis et al. |
| 7,289,973 B2 | 10/2007 | Kiessig et al. |
| 7,318,134 B1 | 1/2008 | Oliveira et al. |
| 7,320,076 B2 | 1/2008 | Caronni |
| 7,386,801 B1 | 6/2008 | Horvitz et al. |
| 7,418,619 B1 | 8/2008 | Uhlmann et al. |
| 7,434,164 B2 | 10/2008 | Salesin et al. |
| 7,434,177 B1 | 10/2008 | Ording et al. |
| 7,440,125 B2 | 10/2008 | Maekawa et al. |
| 7,483,693 B2 | 1/2009 | Lueng et al. |
| 7,505,762 B2 | 3/2009 | Onyon et al. |
| 7,518,611 B2 | 4/2009 | Boyd et al. |
| 7,558,930 B2 | 7/2009 | Kitamura et al. |
| 7,559,016 B1 | 7/2009 | Rakowski et al. |
| 7,574,459 B2 | 8/2009 | Sen et al. |
| 7,590,668 B2 | 9/2009 | Kathuria et al. |
| 7,596,586 B2 | 9/2009 | Gokhale et al. |
| 7,600,133 B2 | 10/2009 | Long et al. |
| 7,624,133 B1 | 11/2009 | Ojalvo |
| 7,630,021 B2 | 12/2009 | Matsuzaka et al. |
| 7,660,817 B2 | 2/2010 | Smith et al. |
| 7,669,141 B1 | 2/2010 | Pegg |
| 7,676,689 B1 | 3/2010 | Shioyama et al. |
| 7,711,771 B2 | 5/2010 | Kirnos |
| 7,734,594 B2 | 6/2010 | Wang |
| 7,739,622 B2 | 6/2010 | DeLine et al. |
| 7,809,687 B2 | 10/2010 | Cisler et al. |
| 7,809,688 B2 | 10/2010 | Cisler et al. |
| 7,836,311 B2 | 11/2010 | Kuriya et al. |
| 7,853,566 B2 | 12/2010 | Cisler et al. |
| 7,853,567 B2 | 12/2010 | Cisler et al. |
| 7,856,424 B2 | 12/2010 | Cisler et al. |
| 7,860,839 B2 | 12/2010 | Cisler et al. |
| 7,882,072 B1 | 2/2011 | Axe et al. |
| 7,934,064 B1 | 4/2011 | Per et al. |
| 8,010,900 B2 | 8/2011 | Hart et al. |
| 8,055,911 B2 | 11/2011 | Feng et al. |
| 8,099,392 B2 | 1/2012 | Paterson et al. |
| 8,166,415 B2 | 4/2012 | Cisler et al. |
| 8,209,308 B2 | 6/2012 | Rueben et al. |
| 8,229,897 B2 | 7/2012 | Cannon et al. |
| 2001/0047368 A1 | 11/2001 | Oshinsky et al. |
| 2002/0016912 A1 | 2/2002 | Johnson |
| 2002/0023198 A1 | 2/2002 | Kokubun et al. |
| 2002/0046220 A1 | 4/2002 | Freeman et al. |
| 2002/0054158 A1 | 5/2002 | Asami |
| 2002/0063737 A1 | 5/2002 | Feig et al. |
| 2002/0080180 A1 | 6/2002 | Mander et al. |
| 2002/0107886 A1 | 8/2002 | Gentner et al. |
| 2002/0112237 A1 | 8/2002 | Kelts |
| 2002/0120648 A1 | 8/2002 | Ball et al. |
| 2002/0156921 A1 | 10/2002 | Dutta et al. |
| 2002/0160760 A1 | 10/2002 | Aoyama |
| 2002/0174283 A1 | 11/2002 | Lin |
| 2003/0016248 A1 | 1/2003 | Hayes Ubillos |
| 2003/0018878 A1 | 1/2003 | Dorward et al. |
| 2003/0050940 A1 | 3/2003 | Robinson |
| 2003/0063128 A1 | 4/2003 | Salmimaa et al. |
| 2003/0065687 A1 | 4/2003 | Momiji et al. |
| 2003/0097640 A1 | 5/2003 | Abrams et al. |
| 2003/0122874 A1 | 7/2003 | Dieberger et al. |
| 2003/0126247 A1 | 7/2003 | Strasser et al. |
| 2003/0131007 A1 | 7/2003 | Schirmer et al. |
| 2003/0135650 A1 | 7/2003 | Kano et al. |
| 2003/0137540 A1 | 7/2003 | Klevenz et al. |
| 2003/0167380 A1 | 9/2003 | Green |
| 2003/0172937 A1 | 9/2003 | Faries et al. |
| 2003/0195903 A1 | 10/2003 | Manley et al. |
| 2003/0220949 A1 | 11/2003 | Witt et al. |
| 2004/0044707 A1 | 3/2004 | Richard |
| 2004/0066414 A1 | 4/2004 | Czerwinski et al. |
| 2004/0073560 A1* | 4/2004 | Edwards .................. 707/100 |
| 2004/0078641 A1 | 4/2004 | Fleischmann |
| 2004/0088331 A1 | 5/2004 | Therrien et al. |
| 2004/0117459 A1 | 6/2004 | Fry |
| 2004/0125137 A1 | 7/2004 | Stata et al. |
| 2004/0133575 A1 | 7/2004 | Farmer et al. |
| 2004/0139396 A1 | 7/2004 | Gelernter et al. |
| 2004/0143652 A1 | 7/2004 | Grannan et al. |
| 2004/0163009 A1 | 8/2004 | Goldstein et al. |
| 2004/0167942 A1 | 8/2004 | Oshinsky et al. |
| 2004/0175000 A1 | 9/2004 | Caronni |
| 2004/0193953 A1 | 9/2004 | Callahan et al. |
| 2004/0199779 A1 | 10/2004 | Huang |
| 2004/0199826 A1 | 10/2004 | Bertram et al. |
| 2004/0210608 A1 | 10/2004 | Lee et al. |
| 2004/0220965 A1 | 11/2004 | Harville et al. |
| 2004/0220980 A1 | 11/2004 | Forster |
| 2004/0228493 A1 | 11/2004 | Ma |
| 2004/0230892 A1 | 11/2004 | Horton |
| 2004/0236769 A1 | 11/2004 | Smith et al. |
| 2004/0236916 A1 | 11/2004 | Berkowitz et al. |
| 2004/0236958 A1 | 11/2004 | Teicher et al. |
| 2004/0267700 A1 | 12/2004 | Dumais et al. |
| 2005/0010955 A1 | 1/2005 | Elia et al. |
| 2005/0071390 A1 | 3/2005 | Midgley et al. |
| 2005/0091596 A1 | 4/2005 | Anthony et al. |
| 2005/0102695 A1 | 5/2005 | Musser |
| 2005/0108253 A1 | 5/2005 | Metsatahti et al. |

(56) References Cited

U.S. PATENT DOCUMENTS

| | | |
|---|---|---|
| 2005/0138081 A1 | 6/2005 | Alshab et al. |
| 2005/0144135 A1 | 6/2005 | Juarez et al. |
| 2005/0149577 A1 | 7/2005 | Okada et al. |
| 2005/0165867 A1 | 7/2005 | Barton et al. |
| 2005/0187992 A1 | 8/2005 | Prahlad et al. |
| 2005/0204186 A1 | 9/2005 | Rothman et al. |
| 2005/0216527 A1* | 9/2005 | Erlingsson .................... 707/202 |
| 2005/0246398 A1 | 11/2005 | Barzilai et al. |
| 2005/0262168 A1 | 11/2005 | Helliker et al. |
| 2005/0262377 A1 | 11/2005 | Sim-Tang |
| 2006/0026218 A1 | 2/2006 | Urmston |
| 2006/0041603 A1 | 2/2006 | Paterson et al. |
| 2006/0041823 A1 | 2/2006 | Wolfgang et al. |
| 2006/0053332 A1 | 3/2006 | Uhlmann et al. |
| 2006/0064444 A1 | 3/2006 | Van Ingen et al. |
| 2006/0064634 A1 | 3/2006 | Dettinger et al. |
| 2006/0080521 A1 | 4/2006 | Barr et al. |
| 2006/0085792 A1 | 4/2006 | Traut |
| 2006/0088167 A1 | 4/2006 | Bade et al. |
| 2006/0101384 A1* | 5/2006 | Sim-Tang et al. ............. 717/104 |
| 2006/0106893 A1 | 5/2006 | Daniels et al. |
| 2006/0117309 A1 | 6/2006 | Singhal et al. |
| 2006/0137010 A1 | 6/2006 | Kramer et al. |
| 2006/0143250 A1 | 6/2006 | Peterson et al. |
| 2006/0150107 A1 | 7/2006 | Leung et al. |
| 2006/0156246 A1 | 7/2006 | Williams et al. |
| 2006/0161861 A1 | 7/2006 | Holecek et al. |
| 2006/0173848 A1 | 8/2006 | Peterson et al. |
| 2006/0218363 A1 | 9/2006 | Palapudi |
| 2006/0224956 A1 | 10/2006 | Storisteanu et al. |
| 2006/0235907 A1 | 10/2006 | Kathuria et al. |
| 2006/0236406 A1 | 10/2006 | Johnson |
| 2006/0248294 A1 | 11/2006 | Nedved et al. |
| 2006/0253470 A1 | 11/2006 | Friedman et al. |
| 2006/0288205 A1 | 12/2006 | Linares |
| 2007/0027935 A1 | 2/2007 | Haselton et al. |
| 2007/0030528 A1* | 2/2007 | Quaeler et al. ................ 358/453 |
| 2007/0038884 A1 | 2/2007 | Campbell et al. |
| 2007/0043715 A1 | 2/2007 | Kaushik et al. |
| 2007/0043790 A1* | 2/2007 | Kryger .......................... 707/204 |
| 2007/0070066 A1 | 3/2007 | Bakhash |
| 2007/0088702 A1 | 4/2007 | Fridella et al. |
| 2007/0094312 A1 | 4/2007 | Sim-Tang |
| 2007/0106978 A1 | 5/2007 | Felts |
| 2007/0136381 A1 | 6/2007 | Cannon et al. |
| 2007/0136389 A1 | 6/2007 | Bergant et al. |
| 2007/0156772 A1 | 7/2007 | Lechner |
| 2007/0168497 A1 | 7/2007 | Locker et al. |
| 2007/0180268 A1 | 8/2007 | Filimon et al. |
| 2007/0185879 A1* | 8/2007 | Roublev et al. ................ 707/10 |
| 2007/0185922 A1 | 8/2007 | Kapoor et al. |
| 2007/0192386 A1 | 8/2007 | Fries et al. |
| 2007/0266007 A1 | 11/2007 | Arrouye et al. |
| 2007/0271263 A1 | 11/2007 | Merrild |
| 2007/0271303 A1* | 11/2007 | Menendez et al. ............ 707/200 |
| 2007/0288536 A1 | 12/2007 | Sen et al. |
| 2008/0016576 A1 | 1/2008 | Ueda et al. |
| 2008/0022393 A1 | 1/2008 | Waltermann et al. |
| 2008/0028007 A1 | 1/2008 | Ishii et al. |
| 2008/0033922 A1 | 2/2008 | Cisler et al. |
| 2008/0033969 A1 | 2/2008 | Koo et al. |
| 2008/0034004 A1 | 2/2008 | Cisler et al. |
| 2008/0034011 A1 | 2/2008 | Cisler et al. |
| 2008/0034013 A1 | 2/2008 | Cisler et al. |
| 2008/0034016 A1 | 2/2008 | Cisler et al. |
| 2008/0034017 A1 | 2/2008 | Giampaolo et al. |
| 2008/0034018 A1 | 2/2008 | Cisler et al. |
| 2008/0034019 A1 | 2/2008 | Cisler et al. |
| 2008/0034039 A1 | 2/2008 | Cisler et al. |
| 2008/0046557 A1 | 2/2008 | Cheng |
| 2008/0059894 A1 | 3/2008 | Cisler et al. |
| 2008/0065663 A1 | 3/2008 | Farlee et al. |
| 2008/0070496 A1 | 3/2008 | Jackson |
| 2008/0077808 A1 | 3/2008 | Teicher et al. |
| 2008/0082578 A1 | 4/2008 | Hogue et al. |
| 2008/0091655 A1 | 4/2008 | Gokhale et al. |
| 2008/0126441 A1 | 5/2008 | Giampaolo et al. |
| 2008/0126442 A1 | 5/2008 | Cisler et al. |
| 2008/0141029 A1 | 6/2008 | Culver |
| 2008/0168184 A1 | 7/2008 | Freedman et al. |
| 2008/0168245 A1 | 7/2008 | De Atley et al. |
| 2008/0168391 A1 | 7/2008 | Robbin et al. |
| 2008/0172607 A1 | 7/2008 | Baer |
| 2008/0177961 A1 | 7/2008 | McSharry et al. |
| 2008/0208630 A1 | 8/2008 | Fors et al. |
| 2008/0214163 A1 | 9/2008 | Onyon et al. |
| 2008/0216011 A1 | 9/2008 | Gould |
| 2008/0222512 A1 | 9/2008 | Albornoz et al. |
| 2008/0229037 A1 | 9/2008 | Bunte et al. |
| 2008/0250342 A1 | 10/2008 | Clark et al. |
| 2008/0285754 A1 | 11/2008 | Kezmann |
| 2008/0307000 A1 | 12/2008 | Paterson et al. |
| 2008/0307017 A1 | 12/2008 | Lyons et al. |
| 2008/0307018 A1 | 12/2008 | Ulrich et al. |
| 2008/0307019 A1 | 12/2008 | Weiss et al. |
| 2008/0307020 A1 | 12/2008 | Ko et al. |
| 2008/0307175 A1 | 12/2008 | Hart et al. |
| 2008/0307347 A1 | 12/2008 | Cisler et al. |
| 2008/0310628 A1 | 12/2008 | Fujioka et al. |
| 2008/0310633 A1 | 12/2008 | Brown et al. |
| 2008/0313243 A1 | 12/2008 | Poston et al. |
| 2009/0019291 A1 | 1/2009 | Murray |
| 2009/0031401 A1 | 1/2009 | Cudich et al. |
| 2009/0052669 A1 | 2/2009 | Ma |
| 2009/0254591 A1 | 10/2009 | Weiss et al. |
| 2009/0307333 A1 | 12/2009 | Welingkar et al. |
| 2010/0017855 A1 | 1/2010 | Johnson et al. |
| 2010/0217929 A1 | 8/2010 | Kirshenbaum et al. |
| 2011/0016089 A1 | 1/2011 | Freedman et al. |
| 2011/0083088 A1 | 4/2011 | Cisler et al. |
| 2011/0083098 A1 | 4/2011 | Cisler et al. |
| 2011/0087976 A1 | 4/2011 | Cisler et al. |
| 2011/0202763 A1 | 8/2011 | Martin et al. |
| 2011/0302502 A1 | 12/2011 | Hart et al. |
| 2012/0124507 A1 | 5/2012 | Paterson et al. |
| 2012/0198383 A1 | 8/2012 | Cisler et al. |

FOREIGN PATENT DOCUMENTS

| | | |
|---|---|---|
| EP | 1582982 | 10/2005 |
| WO | 01/06356 | 1/2001 |
| WO | 02/101540 | 12/2002 |
| WO | 2005/045756 | 5/2005 |
| WO | 2008/019237 | 2/2008 |
| WO | 2008/019259 | 2/2008 |

OTHER PUBLICATIONS

"Aulaclic: Unit 6. The Recycle Bin," Nov. 2005 [online] [retrieved on Nov. 26, 2007] Retrieved from the Internet:<URL:http://www.teacherclick.com/winxp/t_6_1.htm>, pp. 1-2.

Bonwick, Jeff, "ZFS The Last Word in File Systems," [online] [retrieved on Jan. 22, 2008] Retrieved from the Internet:<URL:http://opensolaris.org/os/community/zfs/docs/zfs.pdf>, 34 pages.

Bonwick et al., "The Zettabyte File System," [online] [retrieved on Jan. 22, 2008] Retrieved from the Internet:<URL:http://partneradvantage.sun.com/protected/solaris10/adoptionkit/tech/zfs/zfs_overview.pdf>, 13 pages.

Griffiths, R., "Leopard first looks: Time Machine," Aug. 8, 2006 [online] [retrieved on Nov. 23, 2007] Retrieved from the Internet:<URL:http://www.macworld.com/2006/08/firstlooks/leotimemac/index.php?pf=1> pp. 1-2.

International Search Report and Written Opinion, PCT/US2007/074729, Jul. 12, 2007, 11 pages.

International Search Report and Written Opinion, PCT/US2007/074881, Jul. 12, 2007, 11 pages.

Sun Microsystems, Inc., "ZFS On-Disk Specification," Draft: Dec. 9, 2005, [online] [retrieved on Jan. 22, 2008] Retrieved from the Internet:<URL:http://opensolaris.org/os/community/zfs/docs/ondiskformat0822.pdf,>, 55 pages.

Bott, "Windows XP Backup Made Easy," [online] [Retrieved on Jul. 7, 2009]; Retrieved from the Internet URL: http://www.microsoft.

(56) References Cited

OTHER PUBLICATIONS com/windowsxp/using/setup/learnmore/bott_03july14.mspx, 4 pages.
Engst, "Retrospect 6.0: Powerful Backup Program Adds Panther Compatibility and Enterprise Features", [online] [Retrieved on Jul. 8, 2009]; Retrieved from the Internet URL:http://www.macworld.com/article/31038/2004/06/retrospect6x0.html, 8 pages.
Harder, "Microsoft Windows XP System Restore," [online] [Retrieved on Jul. 7, 2009] Retrieved from the Internet URL:http://msdn.microsoft.com/en-us/iibrary/ms997627.aspx 8 pages.
"MSDN Academic Alliance Developer Center, Curriculum Repository Glossary," [online]. Retrieved from the Internet <URL: http://www.academicresourcecenter.net/curriculum/glossary.aspx>, retrieved on Apr. 22, 2009, 4 pages.
"StorageSync: Backup, Restore, & Synchronization Software User's Guide", SimpleTech, 2003, 100 pages.
International Search Report and Written Opinion, PCT/US2008/066212, Mar. 9, 2009, 26 pages.
International Search Report and Written Opinion, PCT/US2007/074863 Apr. 21, 2009, 20 pages.
Communication pursuant to Article 94(3) EPC for Application No. EP 07 799 899.5, dated May 14, 2009, 2 pages.
Tittel, Ed. "An EAZ Way to Restore Crippled and Inoperable Systems." ChannelWeb. Apr. 25, 2005. http://www.crn.com/white-box/161502165.
"What's New in Word 2002." Wellesly College Information Services Computing Documentation, Jan. 2002, http://www.wellesley.edu/Computing/Office02/Word02/word02.html. Accessed Aug. 12, 2008.
International Search Report and Written Opinion, PCT/US2007/074653, Aug. 14, 2008, 14 pages.
International Search Report and Written Opinion, PCT/US2008/065146, Oct. 31, 2008, 21 pages.
"How to Interpret Windows Installer Logs," [Online] [Retrieved on Dec. 12, 2009] Retrieved from the Internet URL: http://blogs.technet.com/richard_macdonald/archive/2007/04/02/How-to-Interpret-Windows-Installer-Logs.aspx; published Apr. 4, 2007; 6 pages.
Communication pursuant to Article 94(3) EPC for Application No. EP 07 799 899.5, dated Oct. 7, 2009, 4 pages.
Posey, Brien M., "Working with the Windows Server 2003 Volume Shadow Copy Service". Published Jun. 24, 2004. http://www.windowsnetworking.com/articles_tutorials/Windows-Server-2003-Volume-Shadow-Copy-Service.html.; 11 pages.
In-link files, The Open Group Base, Specifications Issue 6 [online]. IEEE Std 1003.1, 2004 Edition. [retrieved on Apr. 6, 2011]. Retrieved from the Internet:URL:http://pubs.opengroup.org/onlinepubs/009695399/utilities/In.html, 5 pages.
Microsoft-TechNet, "Using Encrypting File System," Nov. 3, 2005, Microsoft, 40 pages.
European Examiner Eugenio Archontopoulos, Communication pursuant to Article 94(3) EPC for Application No. EP 07 813 540.7, dated Jun. 23, 2009, 2 pages.
Chen et al., "Data Redundancy and Compression Methods for a Disk-based Network Backup System", 2004, IEEE, pp. 1-8.
Wang et al., "A Secure and Efficient Desktop Backup and Recovery System", 2007, IEEE, pp. 304-309.
Microsoft Technet: "Restore a previous version of a file," Jan. 21, 2005, [Online] [Retrieved on Oct. 20, 2011] Retrieved from the Internet URL: http://technet.microsoft.com/en-us/library/cc778220(d=printer,v=WS.10).aspx , pp. 1-2.
Extended International Search Report and Written Opinion, EP 11171738.5, Aug. 29, 2011, 5 pages.
Examination Report from European Application No. 07 813 605.8 dated Oct. 27, 2011, 5 pages.
Examination Report from European Application No. 07 813 540.7 dated Oct. 27, 2011, 5 pages.
Extended European Search Report, European Application No. 11184579.8, Nov. 17, 2011, 6 pages.
Office Action dated Feb. 29, 2012 from related Chinese Application No. 200880024710.0, 11 pages.
Godfrey, Michael et al., "Using Original Analysis to Detect Merging and Splitting of Source Code Entities," IEEE Transactions on Software Engineering, vol. 31, No. 2. Feb. 2005. pp. 166-181.

* cited by examiner

DELETION IN ELECTRONIC BACKUPS

TECHNICAL FIELD

The disclosed implementations relate generally to storing and restoring digital data.

BACKGROUND

Modern graphical user interfaces allow a large number of graphical objects or items to be displayed on a display screen at the same time. Operating systems, e.g., Apple Mac OS®, provide user interfaces in which a number of graphical user interface windows can be displayed, overlapped, resized, moved, configured, and reformatted according to the needs of a user or a particular application. Taskbars, menus, virtual buttons, and other user interface elements provide mechanisms for accessing and activating windows even when they are hidden behind other windows.

With the sophisticated tools available, users are encouraged not only to create and save a multitude of items in their computers, but to revise or otherwise improve on them over time. For example, a user can work with a certain file and thereafter save the file's current version on a storage device. The next day, however, the user could have had second thoughts about the revisions, or could have come up with new ideas, and therefore opens the file again.

The revision process is usually straightforward if the user wants to add more material to the file or make changes to what is there. But it is typically more difficult for a user who has changed his/her mind about changes that were previously made and wants the file returned to a previous version. Application programs for word processing typically let the user "undo" previous edits of a text, at least up to a predefined number of past revisions. The undo feature also usually is configured so that the previously made revisions must be undone in reverse chronological order; that is, the user must first undo the most recently made edit, then the second-most recent one, and so on. If the user saves and closes the document and thereafter opens the document again, it might not be possible to automatically undo any previous edits.

SUMMARY

Systems and methods are provided for storing and restoring digital data. In general, in one aspect, a method is provided. The method includes displaying a current view, initiating a history view, the history view including two or more visual representations of corresponding earlier versions of the current view, identifying a selection of an item in a visual representation, receiving an input to delete the selected item, and deleting each instance of the selected item in the history view. Other embodiments of this aspect include corresponding systems, apparatus, computer program products, and computer readable media.

Implementations of the aspect can include one or more of the following features. Deleting each instance can include identifying each version of the item within the history view and deleting the item data associated with each instance. The aspect can further include prompting the user to confirm delete when receiving an input to delete a selected item in the history view.

In general, in one aspect, a method is provided. The method includes displaying a visual representation of a current view, identifying a selection of an item in the current view, receiving an input to delete the selected item, and deleting the item and each instance of the item within a backup archive associated with the current view. Other embodiments of this aspect include corresponding systems, apparatus, computer program products, and computer readable media.

Implementations of the aspect can include one or more of the following features. Receiving the input to delete the selected item can include receiving an input to delete all versions of the selected item. Displaying the visual representation of the current view can include displaying a visual representation of previously deleted items.

In general, in one aspect, a method is provided. The method includes initiating a backup system, selecting one or more preferences for backup operations, the one or more preferences including identifying items to be excluded from the backup operations, and performing one or more backup operations according to the identified preferences, the backup operations generating a backup having stored data corresponding to a file system structure. Other embodiments of this aspect include corresponding systems, apparatus, computer program products, and computer readable media.

Implementations of the aspect can include one or more of the following features. Identifying items to be excluded from the backup operations can include identifying a particular path for exclusion, where items included in the path are excluded in the backup operations. The identified path can designate a temporary items folder or a cache folder. Identifying items to be excluded from the backup operations can include tagging a particular item so that the item is excluded from the backup operations. The identified items to be excluded can be associated with a particular application. The identified items can be e-mail spam messages, instant messaging logs, items designated as temporary, or items in a cache.

Particular embodiments of the subject matter described in this specification can be implemented to realize one or more of the following advantages. Users can efficiently delete multiple versions of a file in a single operation. Confidential data can be securely deleted for all existing versions including all backup versions. Deleting all instances of data avoids inadvertently leaving backup data intact after deleting file system data.

The details of one or more embodiments of the invention are set forth in the accompanying drawings and the description below. Other features, aspects, and advantages of the invention will become apparent from the description, the drawings, and the claims.

DETAILED DESCRIPTION

Figure 1:
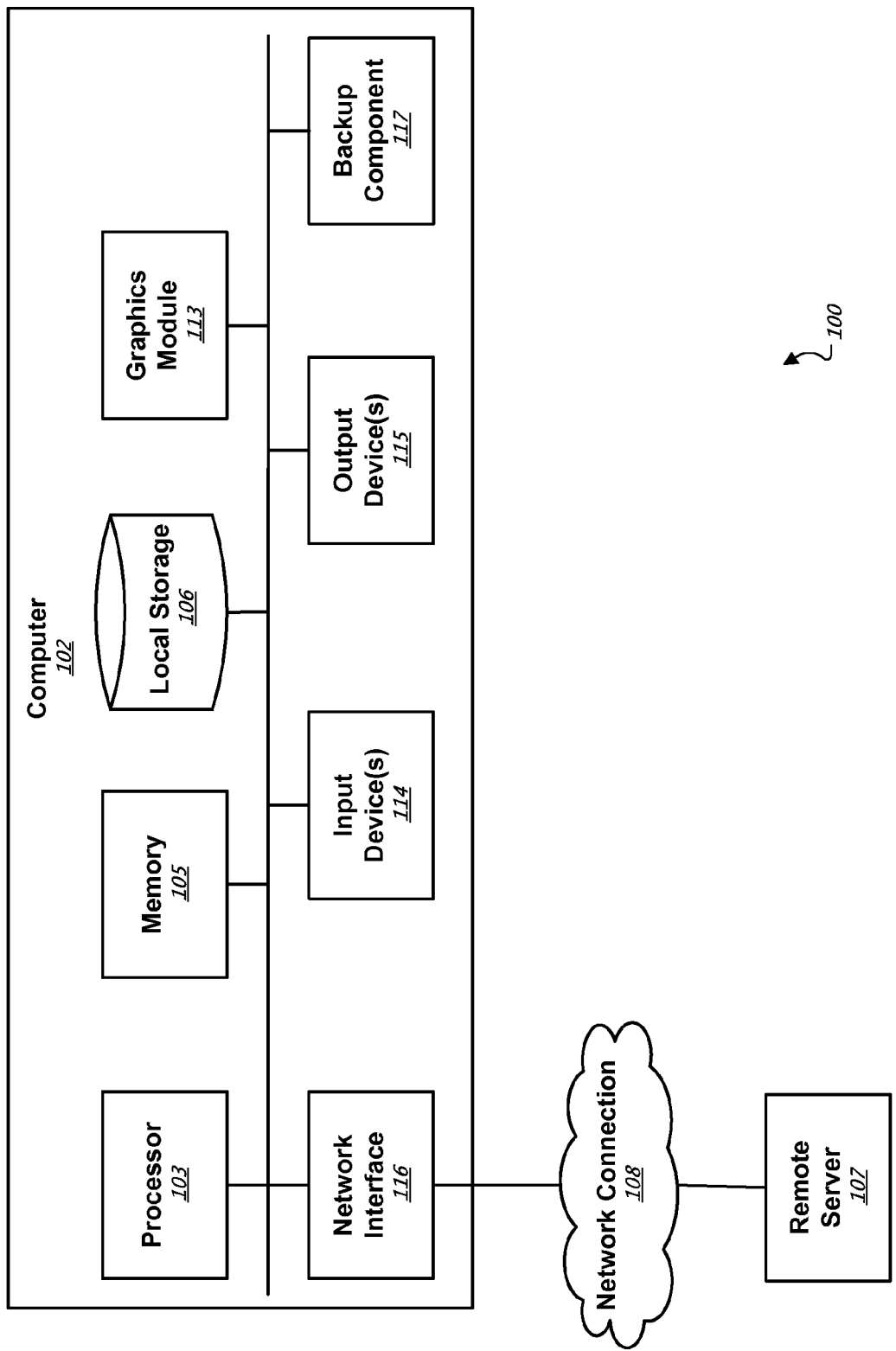
FIG. 1 is a block diagram of an example computer system.

FIG. 1 is a block diagram of an example computer system 100. The system 100 can be used for backup operations including capturing at least one earlier version of a user interface view and allowing a user to initiate a restoration based on the captured earlier version. As used herein, a view refers to an item, element or other content, capable of being presented in a user interface, which can be subjected to a backup operation by a backup component 117 included in system 100. For example, a user interface view can contain any number of icons, files, folders, application state information and/or machine state information, etc.

The system 100 includes a personal computer 102, communicatively coupled to a remote server 107 using a network interface 116, and a network 108 (e.g., local area network, wireless network, Internet, intranet, etc.). The computer 102 generally includes a processor 103, memory 105, one or more input devices 114 (e.g., keyboard, mouse, etc.), and one or more output devices 115 (e.g., a display device). A user interacts with the system 100 using the input and output devices 114, 115. The system 100 also includes various hardware elements. The system 100 can include hardware, software, and combinations of the two.

The computer 102 also includes a local storage device 106 and a graphics module 113 (e.g., a graphics card) for storing information and generating graphical objects, respectively. The local storage device 106 can be a computer-readable medium. The computer-readable medium can be a machine-readable storage device, a machine-readable storage substrate, a memory device, a composition of matter effecting a machine-readable propagated signal, or a combination of one or more of them.

While modifications of a user interface view are described herein with respect to a personal computer 102, it should be apparent that the disclosed implementations can be incorporated in, or integrated with, any electronic device that has a user interface, including without limitation, portable and desktop computers, servers, electronics, media players, game devices, mobile phones, email devices, personal digital assistants (PDAs), embedded devices, televisions, other consumer electronic devices, etc.

Systems and methods are provided for modifying an interface view (e.g., a user interface view). Systems and methods are also provided for removing archived copies of view elements. The systems and methods can be stand alone, or otherwise integrated into a more comprehensive application. In the materials presented below, an integrated system and method for modifying a user interface view is disclosed.

Though discussion is made with reference to modifying a user interface view, those of ordinary skill will recognize that such a view can be based on various data structures, files, processes, and other aspects of information management. It follows that modification to file structures, data and the like is also contemplated in order to achieve the modification of the user interface view. In other words, while the restoration of the user interface view from one state to another can be the most apparent change from the user's perspective, this is accomplished through the corresponding changes in the underlying system content.

One of ordinary skill in the art will recognize that the engines, methods, processes and the like that are described can themselves be an individual process or application, part of an operating system, a plug-in, an application or the like. In one implementation, the system and methods can be implemented as one or more plug-ins that are installed and run on the personal computer 102. The plug-ins are configured to interact with an operating system (e.g., MAC OS® X, WINDOWS XP, LINUX, etc.) and to perform the various functions, as described below.

A system and method for modifying a user interface view can also be implemented as one or more software applications running on the computer 102. Such a system and method can be characterized as a framework or model that can be implemented on various platforms and/or networks (e.g., client/server networks, wireless networks, stand-alone computers, portable electronic devices, mobile phones, etc.), and/or embedded or bundled with one or more software applications (e.g., email, media player, browser, etc.).

The computer 102 includes the backup component 117 that allows for the storage of versions of the computer's files or other items, for example within the local storage 106 or in an external storage repository. In one implementation, the backup component 117 also allows a user to select any of the stored versions and use the selected version to initiate a restoration of that version in the computer. The backup component 117, in various implementations, allows a user to select elements (e.g., files or other items) either from the file system, (e.g., elements including files, folders, application settings, etc. available through the active user interface) or from the backup data (e.g., using a backup interface). The element can be removed and, in some implementations, all corresponding versions of the element in the file system and backup data can automatically be removed.

Figure 2:
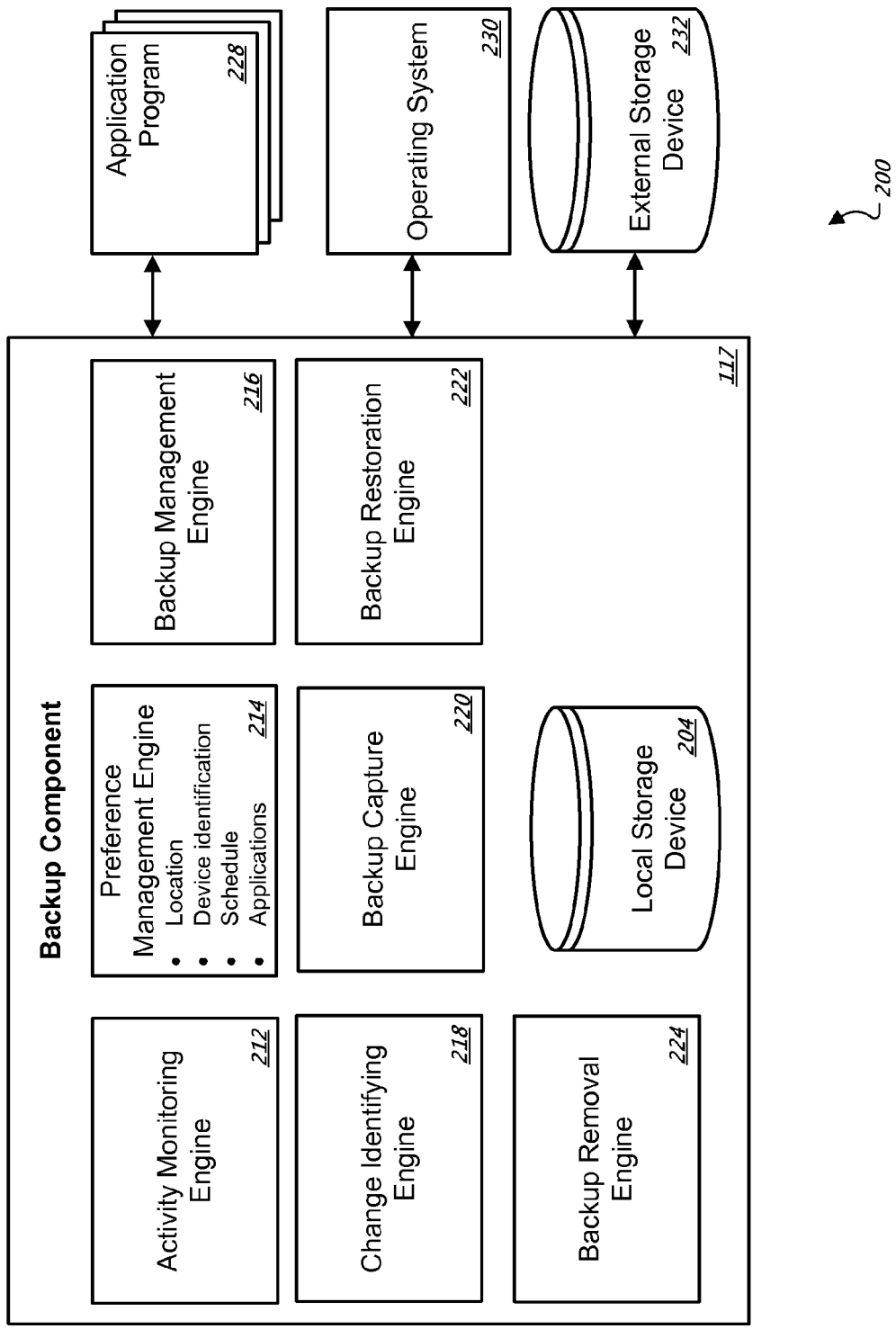
FIG. 2 is a block diagram of an example architecture for backing up and restoring data.

FIG. 2 is a block diagram of an example architecture 200 for providing backup and restoration of data. The architecture 200 (e.g., a software architecture) can be used for enabling the back up and restoration of elements and items, e.g., application files, application data, settings, parameters, and other data including, for example, data associated with a set of applications 228. In some implementations, each application program can be associated with an application program interface ("API"). The API can be used to provide interaction between the application 228 and the backup component 117 for use in backup and restore operations. In one implementation, the interaction allows the backup component 117 to perform backup operations to capture a view of the application including the particular application's files, state, or other items, and can provide for user restoration of selected backup data, to name two examples.

In one implementation, the backup component 117 provides back up and restoration capability for the system 100. Many different items or elements can be the subject of a backup operation in the system 100. For example, folders, files, items, information portions, directories, images, system parameters, playlists, address books, e-mails, e-mail folders, application states, and the like all can be candidates for inclusion in an archive as backup data. Other types of data can be included as backup data.

In some implementations, the backup component 117 can include a local storage device 204 and an external storage device 232. The backup data can be stored on either. Any number of local and/or external storage devices can be used by the backup component 117 for storing backup data. In one implementation, no local storage is provided. In one implementation, the backup component 117 stores the backup data in a format corresponding to a file system structure. Backup data can be stored incrementally during a backup operation where backup data is periodically written to a particular storage device.

In one implementation, one copy of original data (e.g., folders, files, items, information portions, directories, images, system parameters, playlists, address books, e-mails, e-mail folders, application states, preferences, and the like) is stored in the system as backup data (e.g., an original version of the data). When one or more subsequent sets of backup data, or versions, of the data are generated through subsequent backup operations, the backup data can contain only the differences between a current data version and the prior backup data, thereby saving storage space.

For example, if a file is unchanged from the previous backup operation, the duplicate file data is not stored. Instead a reference to the original file is stored. Alternatively, if the file has changed from the previous backup operations, the changed file can be stored. In some implementations, only the changed data of the file is stored. In some implementations, the storage devices 204 and 232 can be used to store the original backup data as well as links pointing to the original backup data. The links can be hard links which reference, or point to, physical data, or as another example can be symbolic links that reference another file on the storage device (e.g., by name or location).

In some implementations, the backup component 117 runs as a background task on an operating system 230, where the task is not visible to the user. The backup component 117 can be capable of running across multiple user accounts.

The backup component 117 includes an activity monitoring engine 212. In one implementation, the activity monitoring engine 212 monitors for changes within data (e.g., files or application states) targeted for inclusion in backup operations. A change can also include the addition of new files or other data structures and the modification or deletion of existing ones. For example, the activity management engine 212 can be responsible for verifying the integrity of a playlist in a music file management program, or for verifying that a corresponding song file exists for a listed song.

In one implementation, the activity monitoring engine 212 is capable of discerning between a substantive change (e.g. the text within a document has been modified) and a non-substantive change (e.g. the play count within an iTunes playlist has been updated, or several changes cancel each other out) through the activity monitoring engine's interaction with the applications 228. The activity monitoring engine 212 can, for example, create a list of modified elements (e.g., files) to be used when a backup operation is eventually triggered. In one implementation, the activity monitoring engine 212 can monitor the system for periods of inactivity. The activity monitoring engine 212 can then trigger a backup operation during a period of time in which the backup operation will not cause a system slowdown for an active user.

A preference management engine 214 specifies some operating parameters of the backup component 117. In one implementation, the preference management engine 214 contains user-specified and/or system default application parameters for the backup component 117. These can include settings for the details of capturing and storing the views. For example, the preference management engine 214 can determine the frequency of backup operations, the storage location for the backup data, the types of elements (e.g., files or other items) that are eligible for inclusion in backup operations, and the events which trigger a backup operation (periodic or event-driven, etc.). In some implementations of the preference management engine 214, the user can specify particular elements to omit from inclusion in backup operations (e.g., particular files or entire applications).

In one implementation, the preference management engine 214 can detect that a new storage device is being added to the system and prompt the user whether the new storage device should be included as a backup repository. Files and other items can be scheduled for a backup operation due to location (e.g. everything on the C: drive and within D:/photos), a correlation with specific applications (e.g. all pictures, music, e-mail in an inbox, an address book, and system settings), or a combination of strategies. Different types of items can be scheduled to be stored on different devices or on different segments of a storage device during a backup operation.

A backup management engine 216 coordinates the collection, storage, and retrieval of views performed by the backup component 117. For example, the backup management engine 216 can trigger the activity monitoring engine 212 to monitor for activities that satisfy one or more criteria specified in the preference management engine 214 for initiating a backup operation.

A change identifying engine 218 locates specific element (e.g., files or other items) to determine if data associated with the elements has changed. The change identifying engine 218 can be capable of discerning a substantive change from a non-substantive change. For example, the change identifying engine 218 can identify a loss of data associated with a user's current view. In one implementation, the change identifying engine 218 traverses a target set of files or other items, comparing a previous version to the current version to determine whether or not a modification has occurred. In addition, the change identifying engine 218 can generate an alert identifying the loss of data and prompt the user to initiate a previous version of the current view to restore the lost data. For example, the change identifying engine 218 can be responsible for verifying whether a data loss has occurred in a music file management program or for verifying that a corresponding song file is unchanged for a listed song.

A backup capture engine 220 locates views (e.g., elements, files or other items) that are to be included in a backup operation. The backup capture engine 220 can invoke the activity monitoring engine 212 and/or the change identifying engine 218, for example, to generate a capture list identifying data to be included in a next backup operation. The backup capture engine 220 can then store copies of listed data in one or more targeted storage repositories. The backup capture engine 220 can track multiple versions of elements (e.g., multiple reference to a particular file or versions of the file reflecting changes to the file across time) included in the backup repository.

The backup component 117 includes a backup restoration engine 222 to restore previous versions of views (e.g., files or other items). In one implementation, the backup restoration engine 222 provides a user interface (e.g., a graphical user interface) where a user can select the item(s) to be restored.

The backup restoration engine 222 can initiate backup operations on one or more data elements or items as directed by a user, the system, or according to a specified or otherwise defined schedule. For example, the user can set up a scheduled backup operation to occur for any number of data files.

A backup removal engine 224 can be used to remove all versions of an element from an archive of backup data maintained by the backup component 117. In some implementations, the backup removal engine 224 can be invoked from the same or similar graphical user interface as the backup restoration engine 222 to allow a user to navigate to and select one or more elements for deletion from a backup archives In other implementations, when a user deletes an element from within one of the applications 228, the user can be provided with an option (e.g., provided by the associated API) to remove all instances of the element. In a further implementation, when an element is permanently removed from the computer 102, such as through a deleted elements handling application (e.g., a trash bin), the user can be provided with an option to remove all instances of the element.

In some implementations, the preference management engine 214 can contain a selectable option of whether or not to delete all instances of an element (e.g., depending upon a specified removal technique). For example, in the event that the user opts to delete an element in a non-recoverable manner (e.g., by file wiping or file shredding using a tool such as the "Secure Erase Trash" feature available with Mac OSX by Apple Inc., of Cupertino, Calif.), the user could specify a preference to remove all archived versions of the element.

Figure 3:
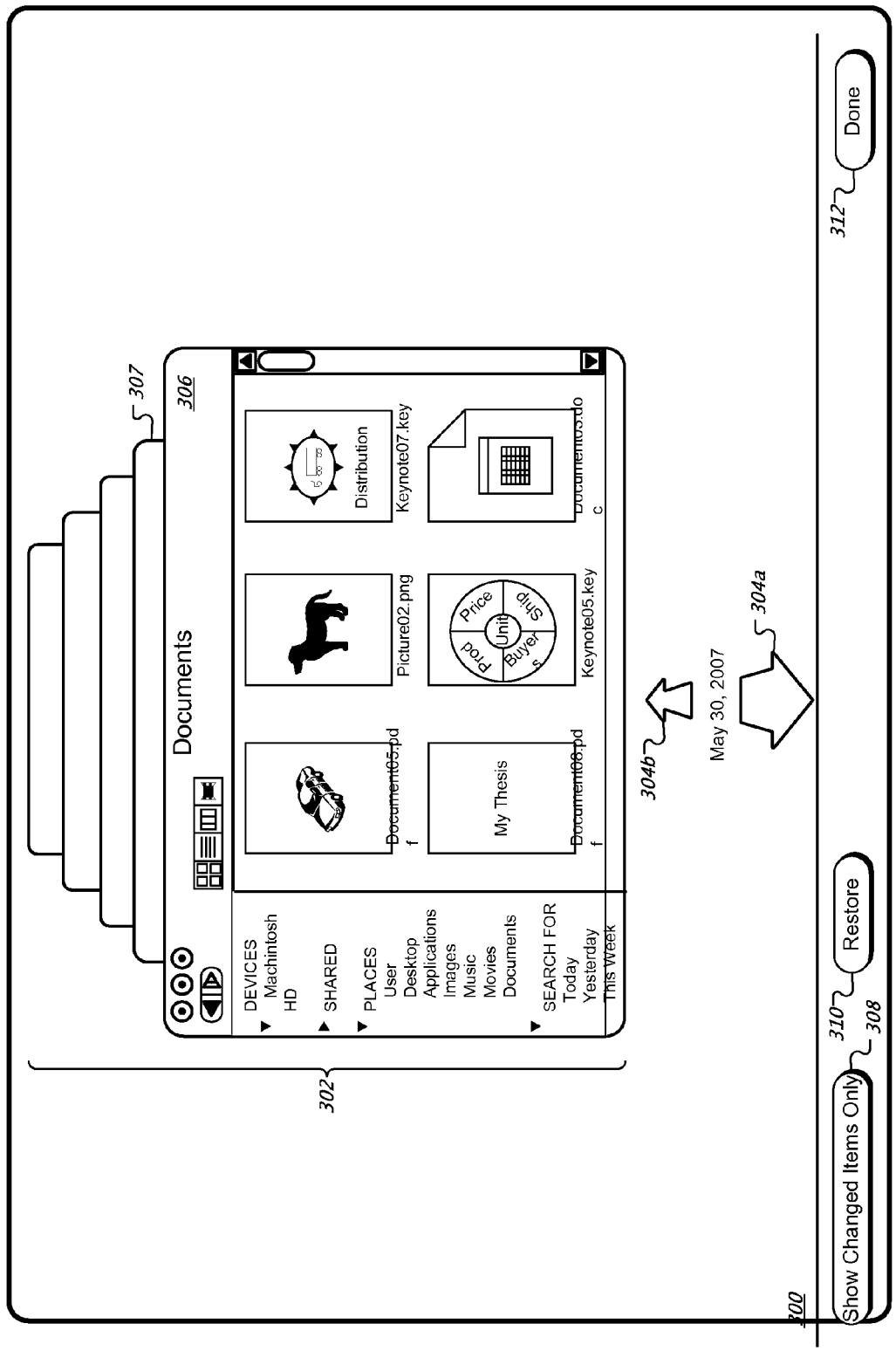
FIG. 3 shows a screen shot depicting an example of a backup interface.

FIG. 3 is a screen shot depicting an example of an initial state for a backup interface 300 after the backup interface has been initiated. The backup interface 300 provides a history view and includes snapshots 302, including a current snapshot 306, and various function buttons described below. As shown, the current snapshot 30a is displaying a most recent snapshot of a file system navigation interface. The elements of the navigation interface are shown they had existed on May 30, 2007, because that is the date of the most recent snapshot (e.g., the date when the corresponding backup operations was performed). Other snapshots 302 can be selected, for example, using the navigation arrows 304. When entering the backup interface 300, the current snapshot 306 can, in some examples, be a default selection such as the most recent snapshot.

As used herein, a snapshot refers to a backup data stored in an archive that corresponds to a particular view (e.g., of the file system, an application, or other view) taken at a particular point in time. The snapshot can include elements (e.g., items, files, state information) associated with the view as specified by the backup component 117. As shown in FIG. 3, the current snapshot 306 contains a visual representation of the contents of a file navigation application's user interface. In other implementations, the backup interface could portray the application's contents in a different manner than they appear when using the application.

In this particular example, there is illustrated a cascading presentation of snapshots 302. Each subsequent snapshot (e.g., snapshot 307) provides snapshot contents captured prior to the May 30, 2007, current snapshot 306. A specified number of snapshots 302 can be presented in the backup interface 300 at any given time. However, there can be many more snapshots than are presently shown.

A user can select a particular snapshot of the snapshots 302 by selecting a snapshot from the stack, causing that snapshot to become the current snapshot 306. Alternatively, the user can use one or more navigation buttons to move between snapshots 302. For example, navigation arrows 304a and 304b can be used to navigate snapshots 302 backward or forward in time, respectively. In some implementations, the user can select items or content within the snapshots 302. For example, the user can select the snapshot 306, and next select one or more files and/or folders to restore to the active user interface using the backup interface 300. In addition, the same selection functionality can be used in previous snapshots, such as snapshot 307, to restore missing data.

The backup interface 300 can also include function controls. For example, the backup interface 300 can include a restore button 310 that, when selected, restores the view to the selected state represented by the selected snapshot. In some implementations, selecting the restore button 310 also exits the backup interface. For example, a user can select one element in a snapshot and then select the restore button 310 to modify the current version of the element selected (e.g., restore the state of the view). For example, in a file navigation application, the user can select one or more files to restore, and this can trigger the restore button to display a more precise message, such as "restore selection only."

In some implementations, a show changed items only button 308 filters the snapshots to show only those that differ from each other and/or from the current state. In various implementations, the button 308 does not refer to the incremental changes between snapshots, but rather when invoked acts to omit those snapshots whose states are identical to the current state of the file navigation application from presentation in the snapshots 302. For example, if the selected snapshot 306 is identical to the snapshot 307 that occurs earlier in time, selecting the changed items only button 308, in some implementations, causes the backup interface to cease displaying one of these versions, e.g., by removing the snapshot 307 from the snapshots 302. This can help the user to view only snapshots that contain changes to the current version.

In some implementations, the restore button 310 is a "restore all" button that, when selected, restores the view to the selected state represented by the selected snapshot.

A "done" button 312 can be selected to exit the backup interface and return the user to a user interface representing the current system (e.g., a desktop user interface). In some implementations, the backup interface can automatically exit upon a particular snapshot being restored. In some implementations, the user can minimize the backup interface for purposes of navigating to other applications, such as an e mail application or a web browser.

Figure 4:
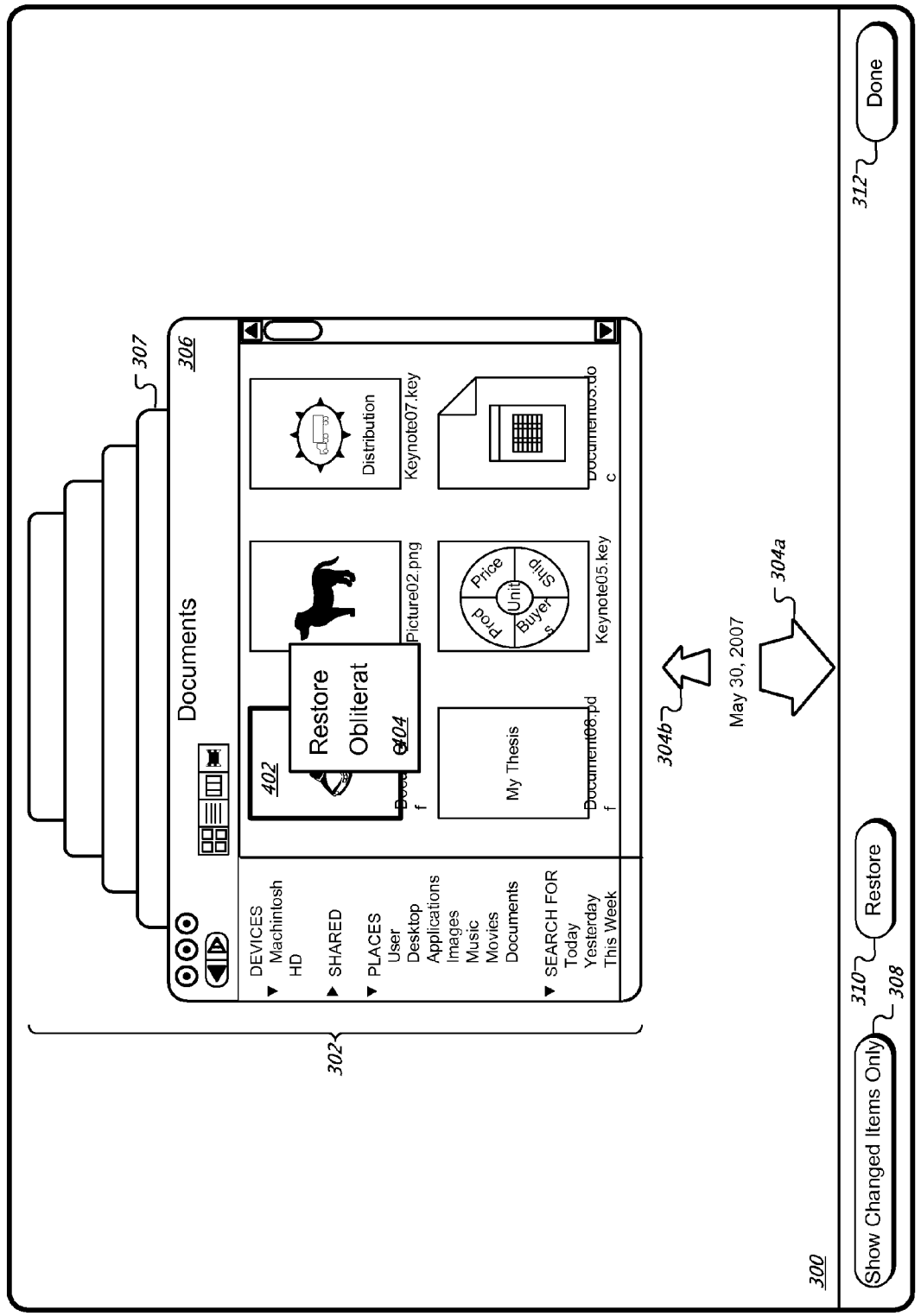
FIG. 4 shows the screen shot of the backup interface of FIG. 3 in which a file has been selected.

FIG. 4 shows the backup interface 300 of FIG. 3 after a file 402 has been selected from within the snapshot 306. In one example, the user can right click (or perform a similar operation) on the item with a mouse to gain access to a drop-down menu 404. The menu 404 provides the user with the options to either restore or otherwise process (e.g., delete or obliterate) the selected file 402. Selection of the obliterate option, in one example, can allow the user to delete all instances and incremental adjustments of the file 320 stored by the backup component (e.g., backup component 117). Thus, selection of the obliterate option would remove the backup data associated with the file 320 from all snapshots 302, for example, all versions of the file reflecting various changes to the file throughout time as captured by previous backup operations.

In some implementations, an obliterate option (e.g., a button) could be provided within the backup interface 300 (e.g., adjacent to the restore button 310). In some implementations, more than one item within the snapshot 306 can be selected and obliterated at the same time. In various implementations, an option is available to delete a specific archived instance of an item or element rather than all instances in all views.

Figure 5:
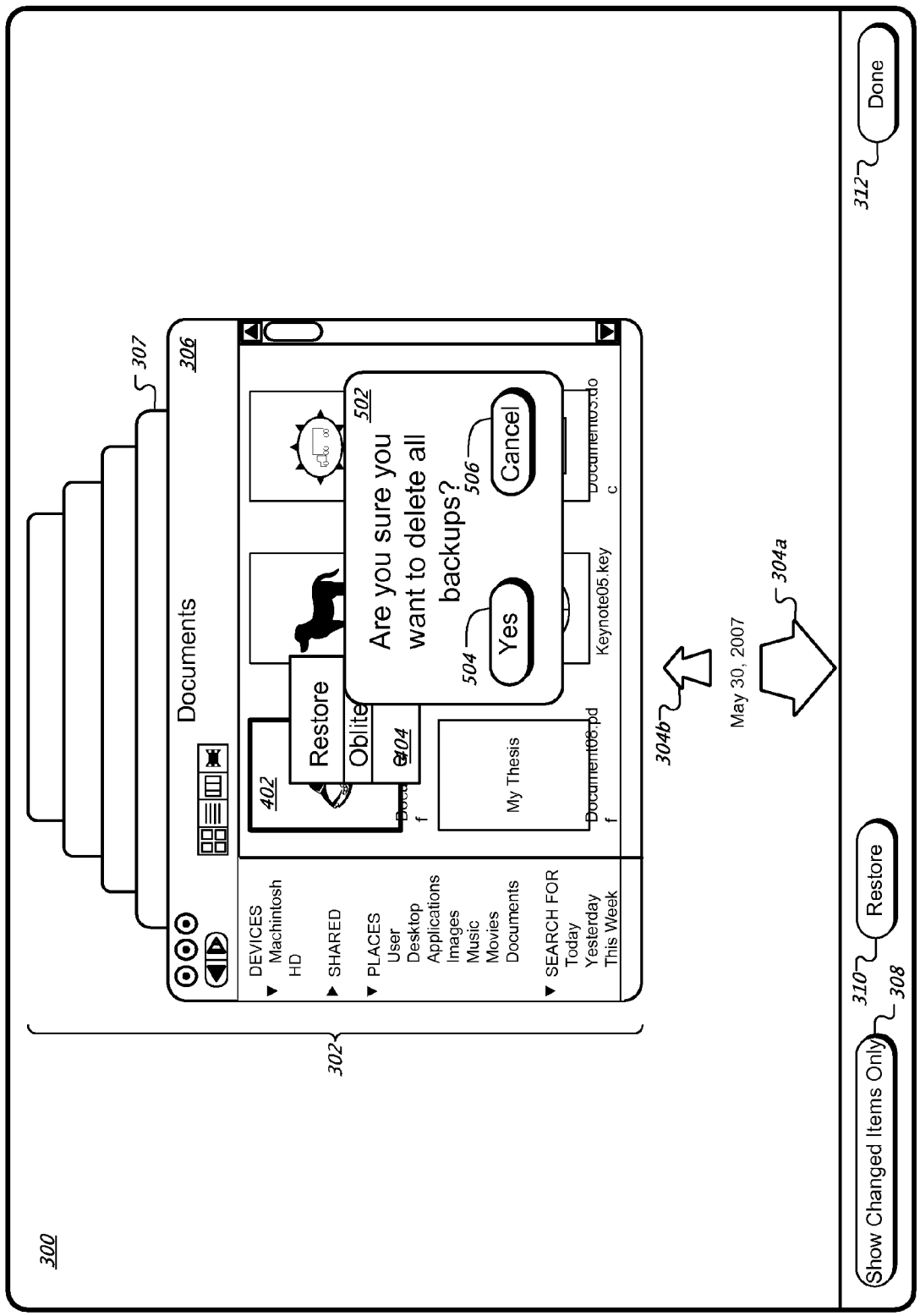
FIG. 5 shows the screen shot of the backup interface of FIG. 4 in which a file is being deleted.

FIG. 5 shows the backup interface 300 of FIG. 4 in which a file is being deleted. In particular, FIG. 5 shows the backup interface 300 following selection of the obliterate option in menu 404. A dialog 502 can be presented in order to verify that the user intends to delete all of the backup versions of the selected file. Selection of a "yes" button 504 allows the backup component to continue with the obliteration of the item from all versions in the archive of backup data. Selecting a "cancel" button 506 provides the user with an opportunity to rescind the request to obliterate the file 402.

Figure 6:
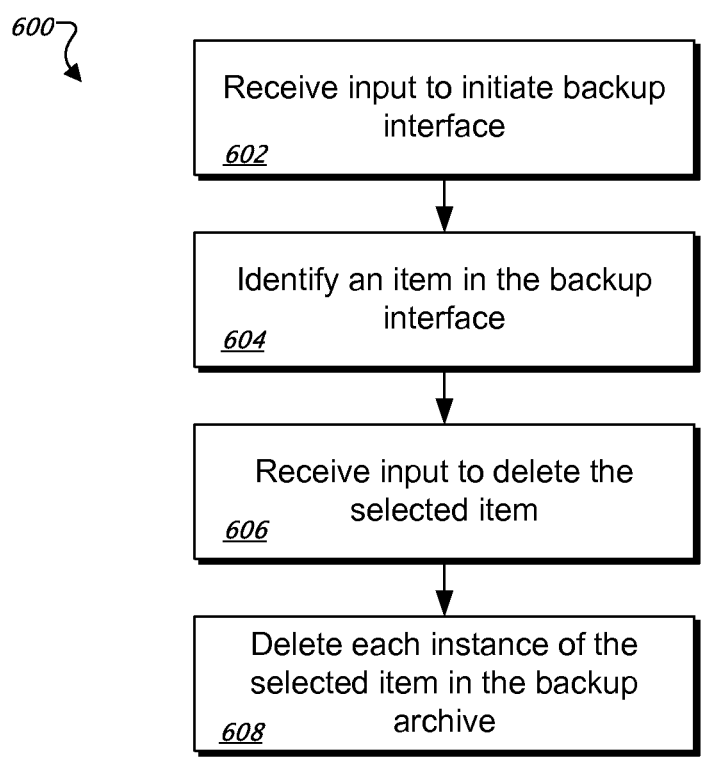
FIG. 6 is a flow chart of an example method for deleting all archived versions of an item from within a backup interface.

FIG. 6 is a flow diagram of an example method 600 for deleting all archived versions of an item from within the backup interface (e.g. providing a history view of the file system). For convenience, the method 600 is described with reference to a system performing the method (e.g., system 100 using backup removal engine 224). The system receives (602) input to initiate the backup interface. The backup interface can be, for example, similar in operation to the backup interface illustrated in FIGS. 3-5. In some implementations, the backup interface is initiated using an icon or menu item within a graphical user interface located within a user desktop interface (e.g., from within a calling application or graphical representation of a file system). The backup interface can, for example, present snapshots representing views (e.g., of files, folders, application settings, etc.) captured during backup operations and stored in an archive of backup data.

The system identifies (604) an item in the backup interface. The item can be, for example, selected by a user from a visual representation (e.g., a list) of items stored in the backup data. In some implementations, more than one item can be selected at once. In one example, a thumbnail representation of a file can be selected from a file navigation application interface.

The system receives an input to delete (606) the identified item. In one example, right-clicking an identified item can display an options menu for deleting the item. In another example, a delete button within the backup interface can be selected to delete an item. Although the item is selected from one particular backup snapshot, the option for deletion can refers to all instances within backups (e.g., all snapshots). In some implementations, a further option can be presented to delete a specific archived copy from a specific backup while leaving the remaining copies and/or versions of the item intact.

The system deletes (608) each instance of the selected item from the backup archives In some implementations, separate copies of the item exist within multiple snapshots. In other implementations, a single copy of the item is stored in the backup along with data portions containing incremental modifications stored e.g., in later backup operations. For example, a single webpage could be archived along with incremental changes of individual photos, metadata, etc. which have been altered since the item was initially archived. This can occur, for example, when the overall data item is comprised of multiple smaller units, some of which have remained identical since the initial archival date. In this example, all copies and all incremental modifications are removed during the deletion process. For example, the backup component (e.g., backup component 117) can traverse the backup data in the backup archive to identify all instances associated with the selected item, where the instances include copies, versions, and references to the item. Alternatively, links to related data can be deleted rendering the stored data worthless. In some implementations, only backup data associated with the item are deleted; the current item is retained.

In some implementations, other steps can occur. For example, in some implementations, a warning is issued before the item is deleted. A user could be presented with a decision dialog prior to deletion taking place. In another example, particular items can be protected from deletion by a security means such as a password. In this example, an authorization process would have to be successfully completed before the deletion would be allowed to continue.

Figure 7:
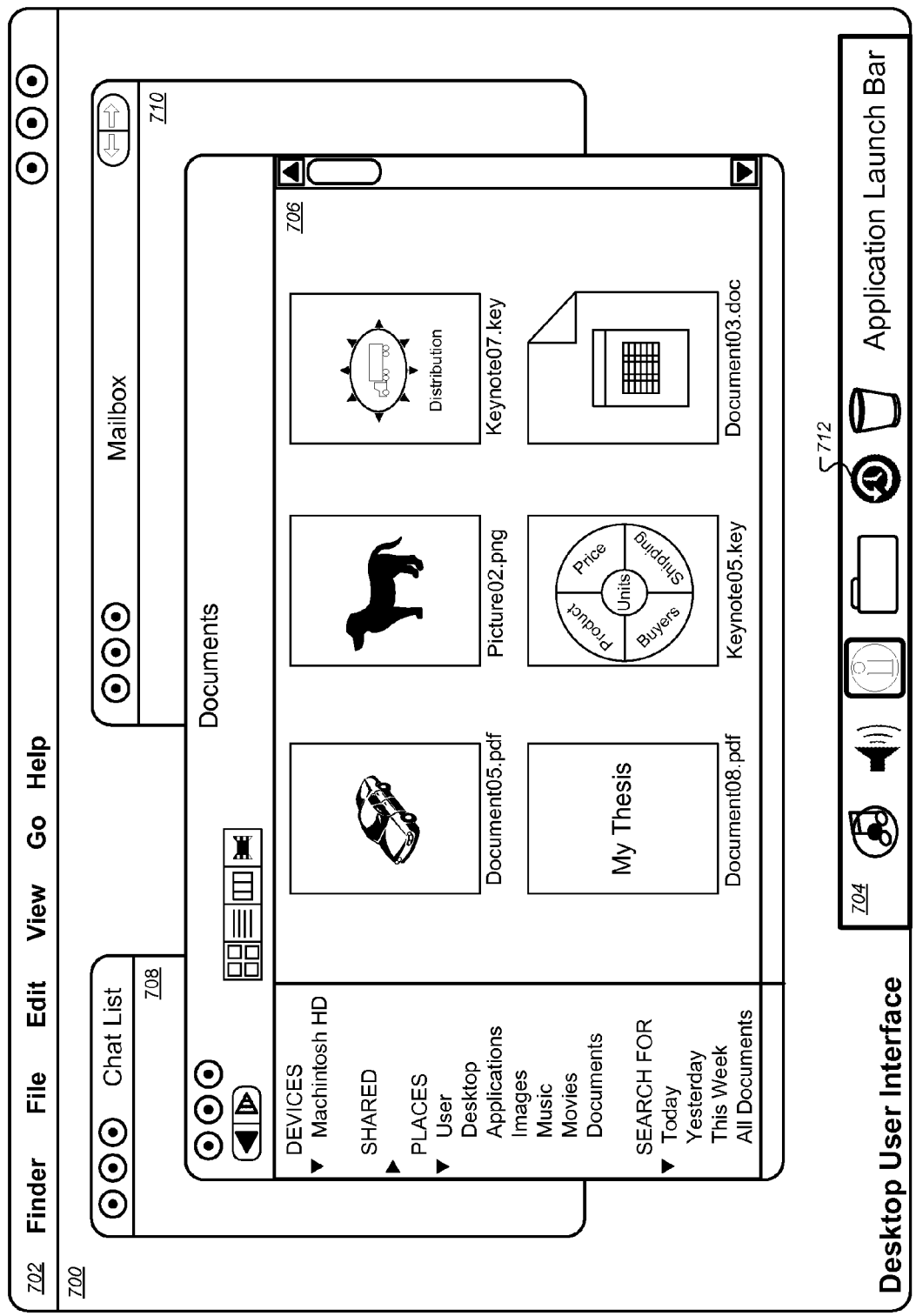
FIG. 7 is a screen shot depicting an example of a desktop user interface with multiple open applications.

FIG. 7 is a screen shot depicting an example of a user interface 700 (e.g., a desktop user interface) with multiple open applications (e.g., applications 228). The user interface 700 can be a user interface provided by an operating system (e.g., operating system 230). The user interface 700 includes a background, a menu bar 702, an application launch bar 704, and may include windows, icons, and other elements. Other configurations are possible. The user interface 700 can have multiple applications running, any or all of which can be presented in a separate window (e.g., a separate graphical representation in the user interface 700). While working with the applications, or at some other time, a user can initiate a backup interface.

As shown in FIG. 7, a user has launched a file navigation interface 706, which is currently presented in the foreground, and a chat application 708 and a mail application 710 that are presented in the background of the user interface 700. In particular, the file navigation interface 706 displays contents of the file system, for example, a user's documents, which are listed as listed as files and folders. The file navigation interface 706 can be used for accessing, opening, and organizing files, folders and other digitally stored items within the computer 102.

The backup interface can be activated to back up or restore digital content within the file navigation application or another application. In some implementations, the user can activate backup interface from the user interface 700 using a user-selectable backup icon 712 in the application launch bar 704. In some implementations, selection of the backup icon 712 launches a backup interface associated with the active application at the time the icon is selected. For example, selection of the backup icon 712 while the active window displayed is the file navigation interface 706 can activate the backup interface including snapshots corresponding to the file navigation interface 706.

As another example, the backup interface can be activated from the menu bar 702. The menu bar 702 can include a backup options menu in addition to the activation selection. The backup options menu can include selections allowing a user to specify data to include in or exempt from a backup operations. For example, in the file navigation application 706, the user can identify which content to include in the backup data (e.g., individual folders, storage devices, files, etc.).

In other implementations, the user can choose to enter the backup interface directly from an operating system menu. In some implementations, the backup component can include several icons or menus available in other locations within the user interface 700 or running applications, thereby providing several options for activating or launching the backup interface.

Figure 8:
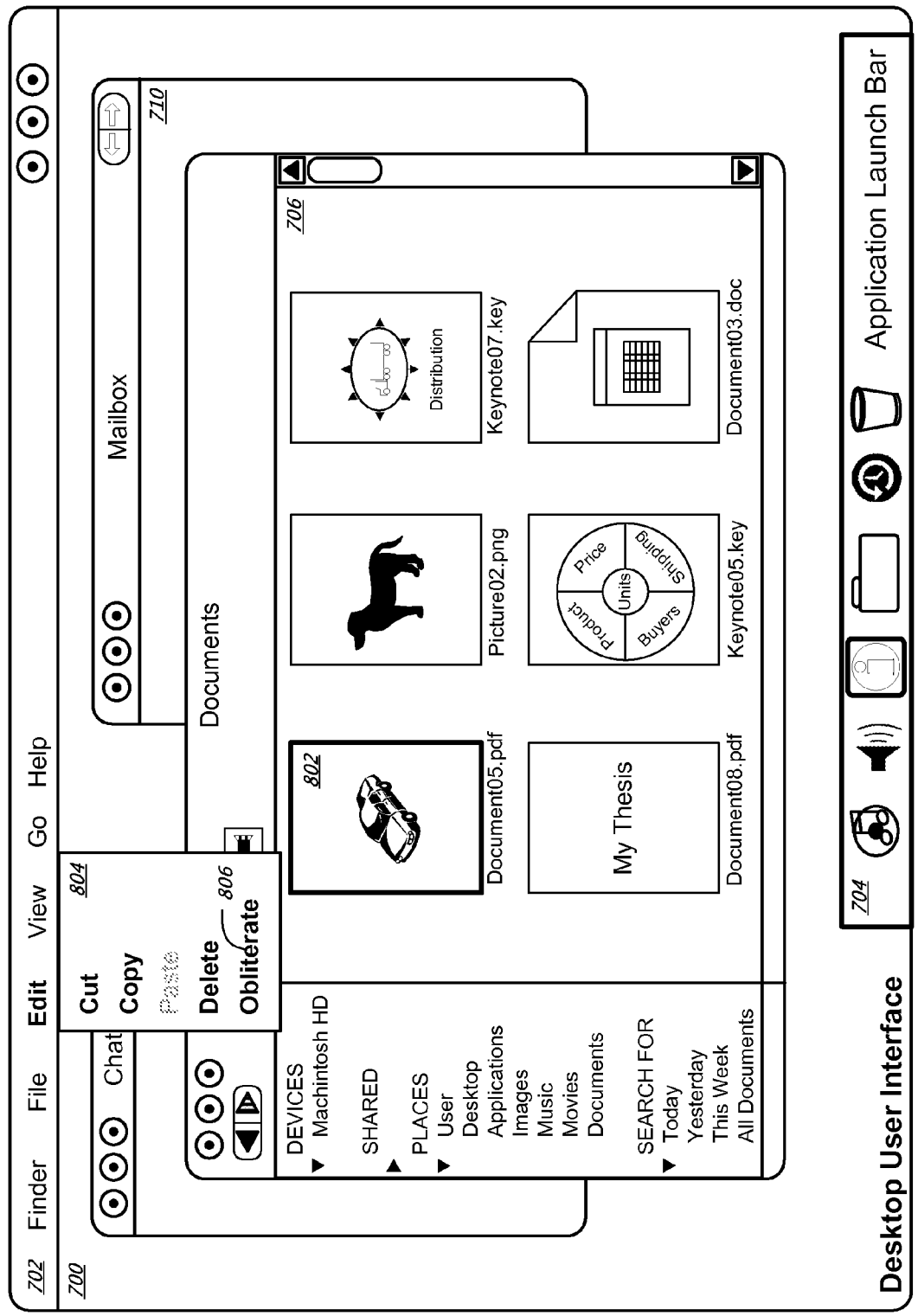
FIG. 8 shows the screen shot of FIG. 7 in which a file has been selected.

FIG. 8 shows the user interface 700 of FIG. 7 in which a file 802 has been selected. Following the selection of file 802, a desktop edit menu 804 can be navigated from within the menu bar 702. The edit menu 804 includes a number of options associated with the selected file 802, for example, to cut, copy, or delete the selected file 802. In FIG. 8, the delete option in the edit menu 804 deletes only the selected instance of the file 802.

The edit menu 804 also includes an obliterate option 806. Selection of the obliterate option 806 can allow the user to delete all archived versions of the file 802 stored by the backup component in addition to removing the active file 802. In some implementations, more than one item can be obliterated, for example by selecting more than one item from within the application window 706. The obliterate option 806, in some implementations, is displayed within the edit menu 804 only if one or more backup versions of the selected file 802 exist in the backup archives Alternatively, in some implementations, when the user selects an obliteration of an item (e.g., the file 802), only the backups of the item are deleted while keeping the current item. Thus, the user can delete the corresponding backup data associated with an item without entering the backup interface.

In some implementations, the user is prompted for verification before the file 802 is obliterated. For example, a dialog window can be displayed to request confirmation of the obliteration before execution. Additionally, a different or additional warning prompt can be displayed. This warning prompt can indicate that taking the suggested obliterate action can cause undesired results (e.g., inability to restore data if the current item later becomes corrupted or otherwise unusable).

Figure 9:
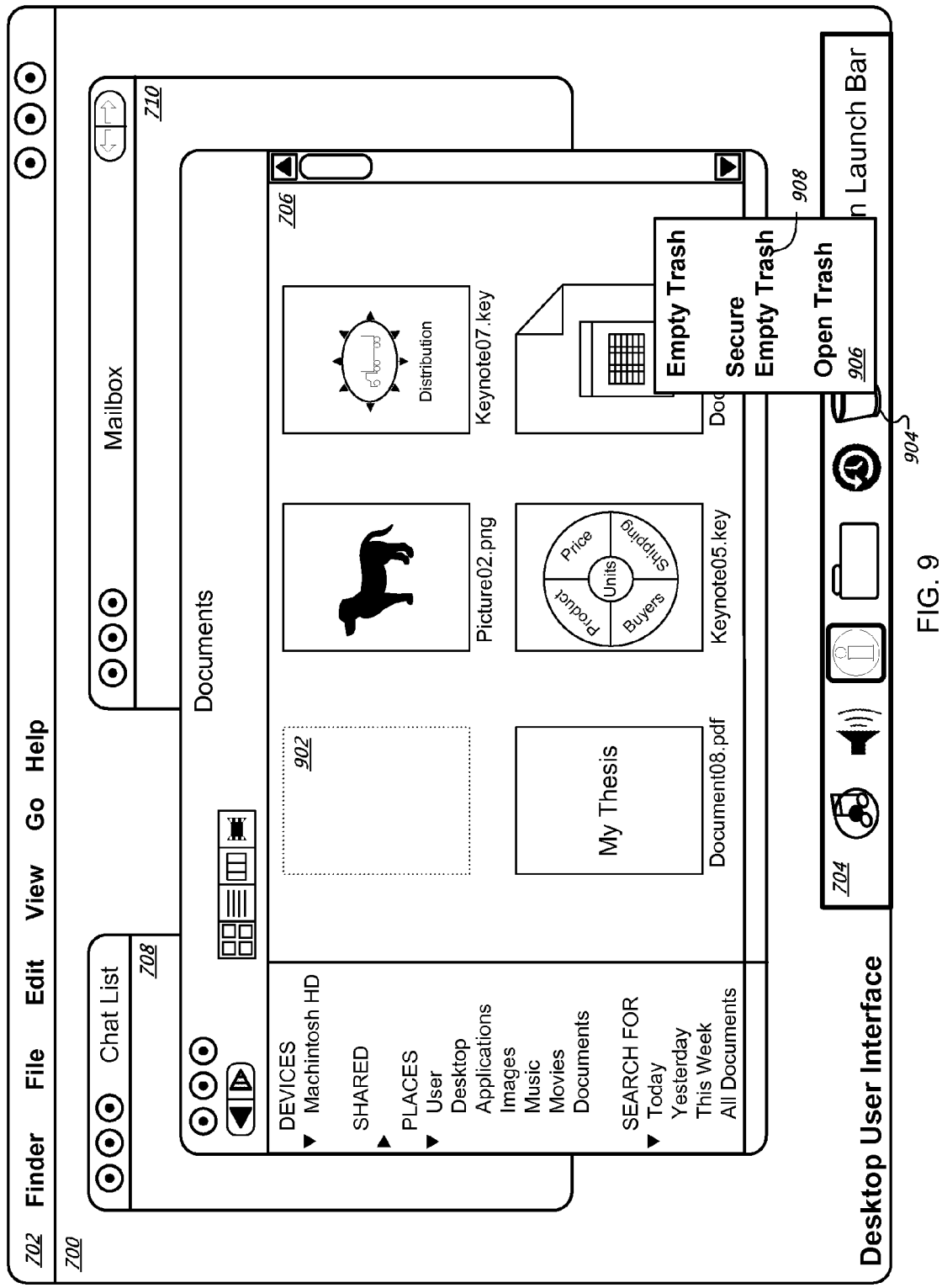
FIG. 9 shows the screen shot of FIG. 7 in which a file has been deleted.

FIG. 9 shows the user interface 700 of FIG. 7 in which a file 902 has been deleted. For example, the file 902 could have been deleted by selecting a delete option from a menu (e.g., from the edit menu of the desktop menu 701 or a context menu of the file 902 e.g., presented by right clicking the file 902). Alternatively, the file 902 could have been dragged to a trash icon, e.g., trash can icon 904. When selected, the trash can icon 904 can display an associated options menu 906. Alternatively, the trash can icon 904 can be selected to present a user interface displaying the deleted items located within. The trash can icon 904, for example, can launch a deleted items handling application or operating system feature (e.g., Recycle Bin by Microsoft Corp. of Redmond, Wash. or Trash by Apple Inc., of Cupertino, Calif.). The deleted items handling application, for example, can allow the user to either restore or permanently delete items which have been previously deleted from the computer 102.

In some implementations, a secure empty trash option 908, for example, within the options menu 906 can, when selected, remove the previously deleted files in a manner which makes them unrecoverable. For example, the secure empty trash option 908 can overwrite the memory location in which the item had been stored so that no data from the item remains within the memory (e.g., local storage 106, local storage device 204, or external storage device 232).

In addition, in some implementations, the secure empty trash option 908 can trigger the backup removal engine 224 to remove all archived copies corresponding to the deleted item (e.g., file 902). For example, the backup removal engine 224 can traverse the backup data identifying versions of the file 902. Each of these versions can then be deleted, for example, using a secure deletion process.

Figure 10:
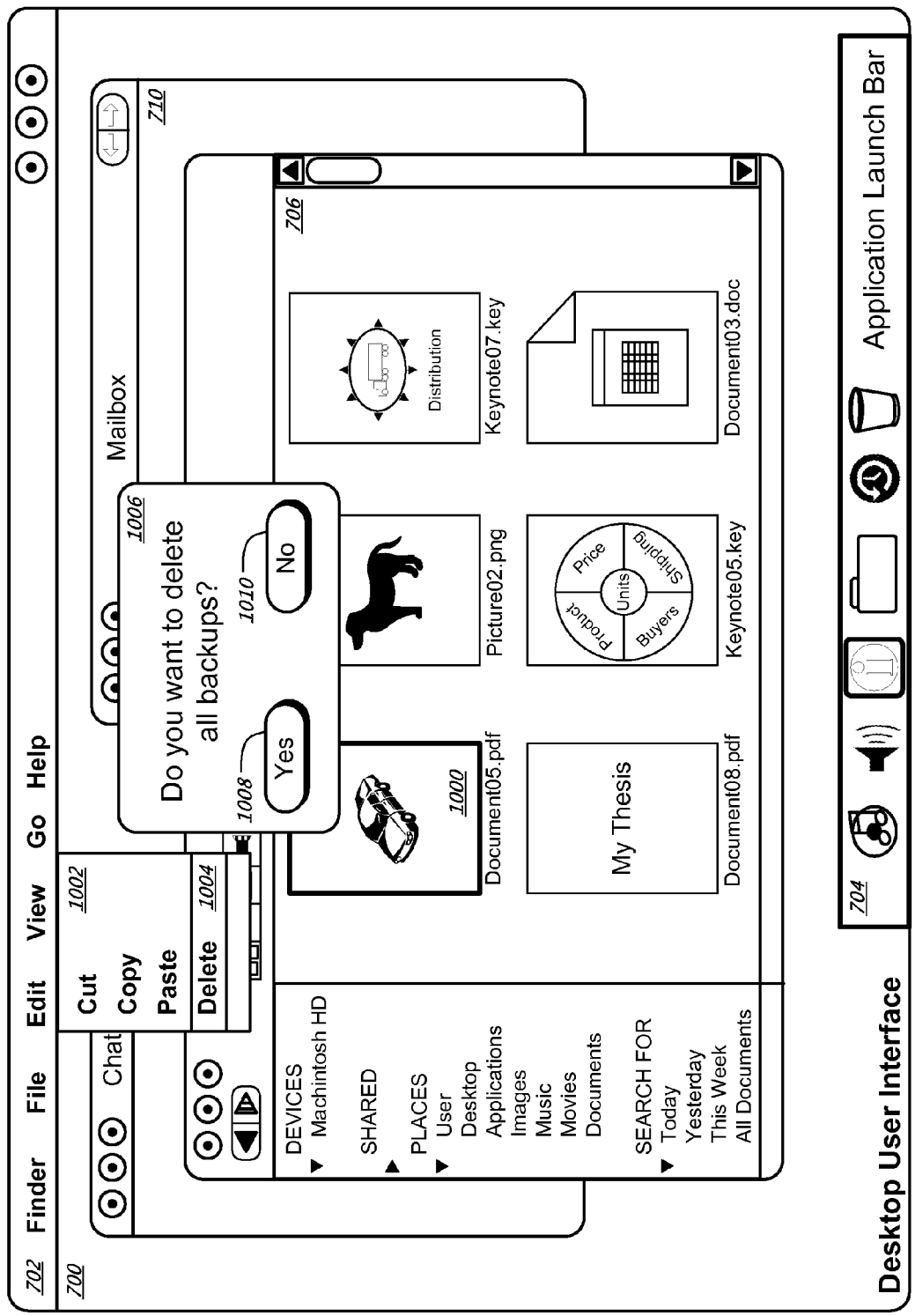
FIG. 10 shows the screen shot of FIG. 7 in which a file has been selected for deletion.

FIG. 10 shows the user interface 700 of FIG. 7 in which a file 1000 has been selected. A delete option 1004 can be activated within a desktop edit menu 1002. Activation of the delete option 1004 generates a dialog 1006. The dialog 1006 provides the user with the option to delete all copies of the selected file 1000, including those versions located in backup data (e.g., as an alternative to the "obliterate" edit menu option shown in FIG. 8). Selection of a "yes" button 1008 confirms that the backup removal engine 224 can remove all archived versions of the file 1000. Selection of a "no" button 1010 instructs the computer 102 to delete only the current version of the file 1000, leaving any backup versions intact. In some implementations, a default action, such as only allowing deletion of the archived versions of an item by invoking the backup interface, can be set within the preference management engine 214.

Figure 11:
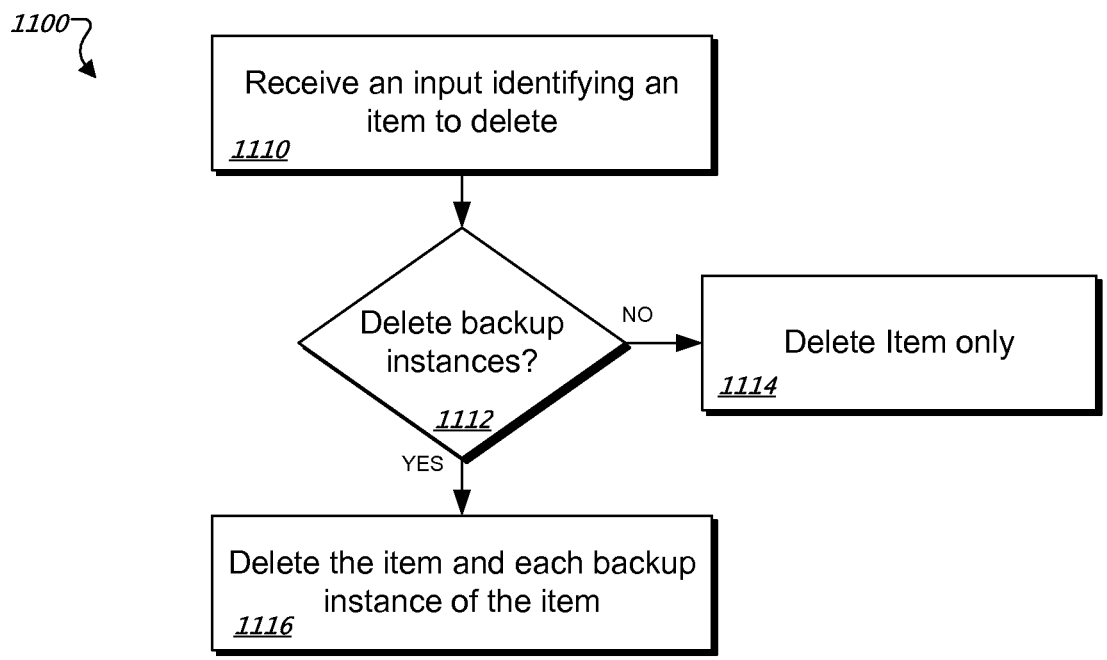
FIG. 11 is a flow chart of an example method for determining whether to delete all archived versions of an item.

FIG. 11 is a flow diagram of an exemplary method 1100 for determining whether to delete all archived versions of an item located in one or more backups during the deletion process of the current version of the item. For convenience, the method 1100 is described with respect to a system (e.g., system 100) performing the method 1100.

The system receives (1110) an input identifying an item to delete. For example, a file could be selected from within a file system navigation interface and the delete command activated through an edit menu. In some implementations, more than one item can be selected for deletion at once.

The system determines (1112) whether or not to delete all backup instances of the item. In some implementations, a dialog box, (e.g., dialog 1006 in FIG. 10), could prompt the user for confirmation in deleting all backup instances of an item. In some implementations, a user preference could indicate whether or not to remove all instances of the item. For example, the user could specify through the preference management engine 214 (FIG. 2) to only remove backup instances from within the backup interface. If backup instances are not being deleted, the system only deletes (1114) the identified item. If backup instances are to be deleted, the system deletes (1116) the identified item and each backup instance of the item.

In some implementations, backup instances are comprised of an initial backup instance of the item plus incremental elements containing updates to the initial instance. In this example, both the initial backup instance and each incremental element associated with the identified item can be deleted. Additionally, various versions of the same file can be identified and removed from the backup archives. The backup instances of the identified item, in various implementations, can be located in multiple local and/or remote storage devices. In some implementations, removal of the backup instances includes overwriting the memory location or otherwise making the data unrecoverable.

In some implementations, an item, application, or other data element can be locked from deletion. For example, a particularly important file can be locked from deletion both as the current version as well the backup data associated with the file. For example particular system files can be excluded from deletion or obliteration. In an alternative example, sensitive files requiring preservation can be locked. In one implementation, locking only prevents the deletion of the most recent backup of the item. Thus, all but the most recent backup copy can be obliterated. In some implementations, a user or administrator can specify items for locking in the backup settings interface. Alternatively, the individual item can be locked, for example, within the file system. For example, a properties tab associated with the item can include an option for locking the item to prevent obliteration.

Figure 12:
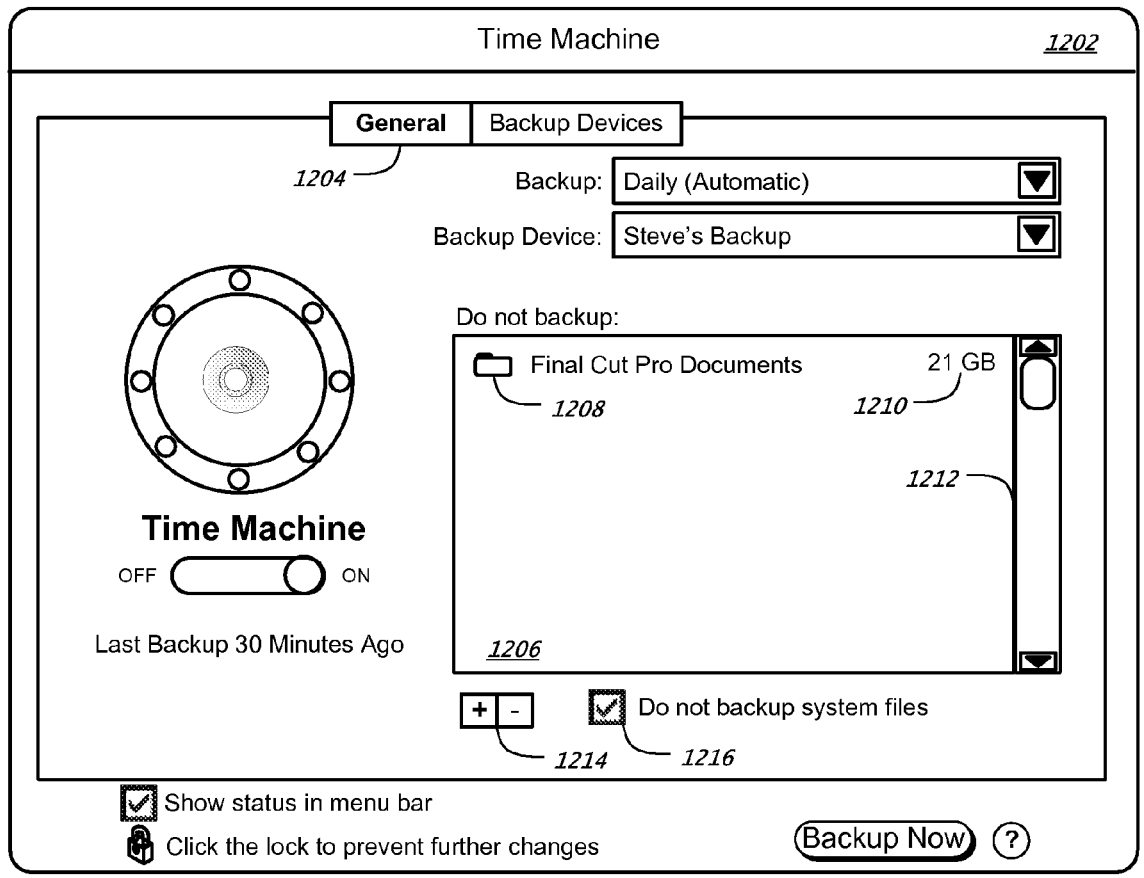
FIG. 12 shows a screen shot depicting an example of a backup settings dialog.

FIG. 12 shows a screen shot depicting an example of a backup settings dialog 1202. In some implementations, the backup settings dialog 1202 is generated by the preference management engine 214 (FIG. 2). A general settings tab 1204 is displayed as selected. Other tabs can be provided. For example, a backup devices tab can allow a user to select particular storage devices for storing backup data.

Within the backup settings dialog 1202, a user can select which data is to be excluded from backup operations. For example, a do not backup pane 1206 contains a list of items excluded from backup operations. Specifically, the pane 1206 includes a "Final Cut Pro Documents" folder 1208. The pane 1206 optionally indicates the size of the excluded data, for example, folder 1208 has a total size 1210 of 21 gigabytes. The items for exclusion from backup operations can include specific applications and/or features, for example, a trash folder, temporary files folder, individual files, and/or general categories (e.g. internet browser cookies, downloaded internet files, caches), as well as specific application data (e.g., particular mail messages such as spam, instant messenger logs), and other archived data. Additionally, a checkbox 1216 can be selected to automatically exclude system files from the backup operations. A scroll bar 1212 allows the user to view additional items which do not fit within the pane 1206.

A pair of add/delete buttons 1214 allow the user to include or remove items from the do not backup pane 1206. For example, selecting the folder 1208 and activating the delete button 1214 can remove the folder 1208 from the do not backup pane 1206. Selecting the add button 1214, in another example, launches e.g., a file navigation interface, to browse and locate additional items to exclude from backup operations.

Figure 13:
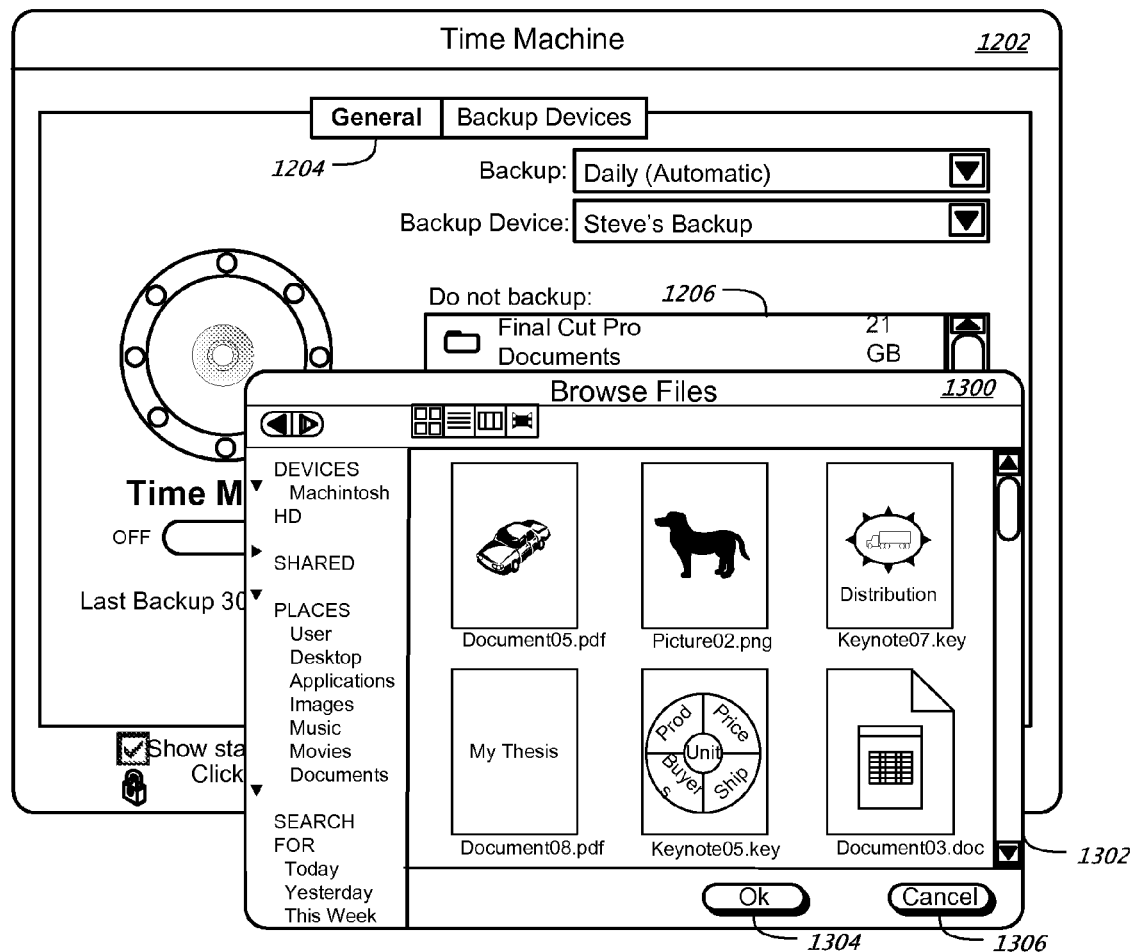
FIG. 13 shows a screen shot of an example backup settings dialog in which the user is browsing a file navigation application.

FIG. 13 shows the backup settings dialog 1202 through which the user is browsing a file navigation interface 1300. In some implementations, the file navigation interface 1300 is launched by selecting the add button 1214 of FIG. 12. Using the file navigation interface 1300, the user can navigate to particular items in the file system. The user can then select one or more files and/or folders to exclude from backup operations. A scroll bar 1302 allows the user to view additional items which do not fit within the viewing window of the file navigation interface 1300.

After selecting one or more files and/or folders, the user can activate an "ok" button 1304 to add the selected items to the list within the do not backup pane 1206. The user can alternatively activate a "cancel" button 1306 to exit the file navigation interface 1300 without selecting any files or folders to be added to the do not backup pane 1206. In some implementations, multiple items can be added without closing the file navigation interface 1300 (e.g., by holding down a control key while selecting items).

In some implementations, items are excluded from backup operations by flagging metadata associated with the items. For example, a particular file to be excluded from backup operations can include metadata indicating that the file is not to be backed up. The item will be excluded from the backup regardless of the location or name of the item in the file system. In an alternative implementation, an item is excluded from backup operations by path. For example, a particular folder (e.g., a temporary items folder) can be excluded based on the particular file system location, or path (e.g., C:\home\internet\temporary files). The path allows all items contained within the folder to be excluded from backup operations, including items added to the folder at a later time. However, moving an item from the folder to another location in the file system can allow the item to be included in a backup operation.

In the above description, for purposes of explanation, numerous specific details are set forth in order to provide a thorough understanding. It will be apparent, however, to one skilled in the art that implementations can be practiced without these specific details. In other instances, structures and devices are shown in block diagram form in order to avoid obscuring the disclosure.

In particular, one skilled in the art will recognize that other architectures and graphics environments can be used, and that the examples can be implemented using graphics tools and products other than those described above. In particular, the client/server approach is merely one example of an architecture for providing the functionality described herein; one skilled in the art will recognize that other, non-client/server approaches can also be used. Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

An apparatus for performing the operations herein can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it can prove convenient to construct more specialized apparatuses to perform the method steps. The required structure for a variety of these systems will appear from the description. In addition, the present examples are not described with reference to any particular programming language. It will be appreciated that a variety of programming languages can be used to implement the teachings as described herein. Furthermore, as will be apparent to one of ordinary skill in the relevant art, the modules, features, attributes, methodologies, and other aspects can be implemented as software, hardware, firmware or any combination of the three. Of course, wherever a component is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present description is in no way limited to implementation in any specific operating system or environment.

The subject matter described in this specification can be implemented as one or more computer program products, i.e., one or more modules of computer program instructions encoded on a computer readable medium for execution by, or to control the operation of, data processing apparatus. The instructions can be organized into modules (or engines) in different numbers and combinations from the exemplary modules described. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

While this specification contains many specifics, these should not be construed as limitations on the scope of what may be claimed, but rather as descriptions of features specific to particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject matter of this specification has been described in terms of particular embodiments, but other embodiments can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method comprising:
    displaying a current view of a user interface window;
    initiating a history view, the history view including a history interface having two or more visual representations of user interface windows corresponding to earlier versions of the current view of the user interface window, where the two or more visual representations are associated with prior states of the current view of the user interface window for two or more respective backup archives;
    identifying a selection of an item displayed in a first visual representation of the user interface window in the history view;
    receiving an input to delete the selected item; and
    deleting each instance of a plurality of instances of the selected item in the history view in response to the received input, wherein the plurality of instances include an initial backup instance of the item and one or more incremental instances containing updates to the initial instance.

2. The method of claim 1, the deleting each instance comprises:
    identifying each version of the item represented within the history view; and
    deleting the item data associated with each instance.

3. The method of claim 1, further comprising:
    prompting the user to confirm delete when receiving an input to delete a selected item in the history view.

4. The method of claim 1, where each instance of the selected item is deleted in the history view while maintaining the instance of the selected item in the current view.

5. A method comprising:
    displaying a current view of a user interface window including one or more items;
    identifying a selection of an item in the current view of the user interface window;
    receiving an input to delete the selected item; and
    automatically deleting the selected item and each instance of a plurality of backup instances of the item within a backup archive, the plurality of backup instances including an initial backup instance of the item and one or more incremental elements containing updates to the initial instance.

6. The method of claim 5, where receiving the input to delete the selected item includes receiving an input to delete all versions of the selected item.

7. The method of claim 5, where displaying the visual representation of the current view includes displaying a visual representation of previously deleted items.

8. A system comprising:
    one or more processors operable to interact with computer-readable storage media in order to perform operations including:
        displaying a current view of a user interface;
        initiating a history view, the history view including a history interface having two or more visual representations of user interface windows corresponding to earlier versions of the current view of the user interface window, where the two or more visual representations are associated with prior states of the current view of the user interface window for two or more respective backup archives;
        identifying a selection of an item displayed in a first visual representation of the user interface window in the history view;
        receiving an input to delete the selected item; and
        deleting each instance of a plurality of instances of the selected item in the history view in response to the received input, wherein the plurality of instances include an initial backup instance of the item and one or more incremental instances containing updates to the initial instance.

9. The system of claim 8, wherein deleting each instance comprises:
    identifying each version of the item represented within the history view; and
    deleting the item data associated with each instance.

10. The system of claim 8, where each instance of the selected item is deleted in the history view while maintaining the instance of the selected item in the current view.

11. A system comprising:
one or more processors operable to interact with computer-readable storage media in order to perform operations including:
  displaying a current view of a user interface window including one or more items;
  identifying a selection of an item in the current view of the user interface window;
  receiving an input to delete the selected item; and
  automatically deleting the selected item and each instance of a plurality of backup instances of the item within a backup archive, the plurality of backup instances including an initial backup instance of the item and one or more incremental elements containing updates to the initial instance.

12. The system of claim 11, where receiving the input to delete the selected item includes receiving an input to delete all versions of the selected item.

13. The system of claim 11, where displaying the visual representation of the current view includes displaying a visual representation of previously deleted items.

14. A method comprising:
  displaying a current view of a user interface window;
  initiating a history view, the history view including a history interface having two or more snapshots presenting views corresponding to earlier versions of the current view of the user interface window and associated with corresponding backup data;
  identifying a selection of an item displayed in one of the snapshots in the history view;
  receiving an input to delete the selected item; and
  deleting each instance of the selected item in the history view.

15. The method of claim 14, wherein deleting each instance comprises:
  identifying each version of the item represented within the history view; and
  deleting the item data associated with each instance.

16. The method of claim 14, where each instance of the selected item is deleted in the history view while maintaining the instance of the selected item in the current view.

* * * * *

UNITED STATES PATENT AND TRADEMARK OFFICE
CERTIFICATE OF CORRECTION

PATENT NO.         : 8,745,523 B2
APPLICATION NO.    : 11/760662
DATED              : June 3, 2014
INVENTOR(S)        : McInerney et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 648 days.

Signed and Sealed this
Fourth Day of August, 2015

Michelle K. Lee
*Director of the United States Patent and Trademark Office*